US012238742B2

United States Patent
Li et al.

(10) Patent No.: US 12,238,742 B2
(45) Date of Patent: Feb. 25, 2025

(54) CONTROL RESOURCE SET CONFIGURATION AND PHYSICAL DOWNLINK CONTROL CHANNEL DESIGN FOR ABOVE 52.6GHZ

(71) Applicant: Intel Corporation, Santa Clara, CA (US)

(72) Inventors: Yingyang Li, Beijing (CN); Gang Xiong, Portland, OR (US); Daewon Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/477,380

(22) Filed: Sep. 28, 2023

(65) Prior Publication Data

US 2024/0023125 A1    Jan. 18, 2024

Related U.S. Application Data

(63) Continuation of application No. 17/108,876, filed on Dec. 1, 2020, now Pat. No. 11,800,527.

(60) Provisional application No. 62/942,643, filed on Dec. 2, 2019, provisional application No. 62/942,664, filed on Dec. 2, 2019.

(51) Int. Cl.
  *H04W 72/23*    (2023.01)
  *H04L 5/00*    (2006.01)
  *H04W 72/0453*    (2023.01)

(52) U.S. Cl.
  CPC .......... *H04W 72/23* (2023.01); *H04L 5/0048* (2013.01); *H04L 5/0094* (2013.01); *H04W 72/0453* (2013.01)

(58) Field of Classification Search
  None
  See application file for complete search history.

(56) References Cited

U.S. PATENT DOCUMENTS

| | | | |
|---|---|---|---|
| 2019/0044649 A1 | 2/2019 | Kim et al. | |
| 2019/0075553 A1 | 3/2019 | Sun et al. | |
| 2019/0141647 A1 | 5/2019 | Nimbalker et al. | |
| 2019/0166615 A1 | 5/2019 | Nimbalker et al. | |
| 2020/0029332 A1* | 1/2020 | Chen | H04W 72/51 |
| 2020/0154413 A1* | 5/2020 | Hosseini | H04W 72/0446 |
| 2020/0274682 A1* | 8/2020 | Sun | H04W 16/14 |

(Continued)

OTHER PUBLICATIONS

United States Patent Office—Office Action mailed Dec. 23, 2022, from U.S. Appl. No. 17/108,876, 13 pages.

(Continued)

*Primary Examiner* — Phirin Sam
(74) *Attorney, Agent, or Firm* — Schwabe, Williamson & Wyatt, P.C.

(57) ABSTRACT

Various embodiments herein provide techniques for control resource set (CORESET) configuration and PDCCH design for system operating above 52.6 GHz carrier frequency. Embodiments provide detailed design for the CORESET structure to support multiple precoders for a PDCCH. The DFT size of control could be different from DFT size of data. Additionally, embodiments provide techniques for channel multiplexing of control and data transmission for system operating above 52.6 GHz carrier frequency. Other embodiments may be described and claimed.

20 Claims, 22 Drawing Sheets

(56) References Cited

U.S. PATENT DOCUMENTS

| | | |
|---|---|---|
| 2021/0127389 A1 | 4/2021 | Liu et al. |
| 2021/0160030 A1 | 5/2021 | Myung et al. |
| 2021/0185614 A1 | 6/2021 | Zhou et al. |
| 2021/0314046 A1 | 10/2021 | Kim et al. |
| 2021/0329634 A1 | 10/2021 | Kim et al. |
| 2021/0329676 A1* | 10/2021 | Yang ..................... H04W 4/46 |
| 2021/0385857 A1 | 12/2021 | Kwak et al. |
| 2022/0085940 A1* | 3/2022 | Xiong ............... H04W 72/0453 |
| 2022/0217697 A1 | 7/2022 | Lee et al. |
| 2022/0225389 A1 | 7/2022 | Go et al. |
| 2022/0248399 A1 | 8/2022 | You et al. |
| 2022/0393736 A1 | 12/2022 | Park |

OTHER PUBLICATIONS

United States Patent Office—Notice of Allowance mailed Jun. 23, 2023, from U.S. Appl. No. 17/108,876, 13 pages.

* cited by examiner

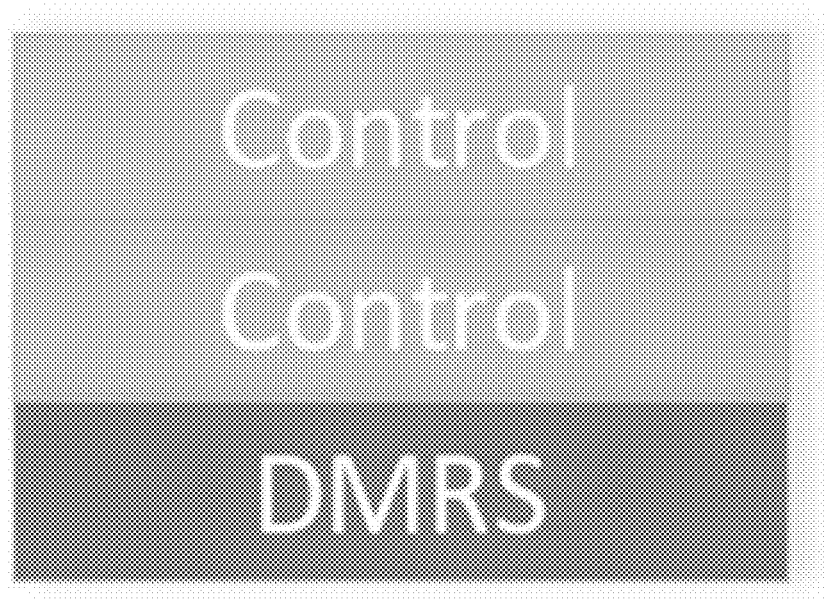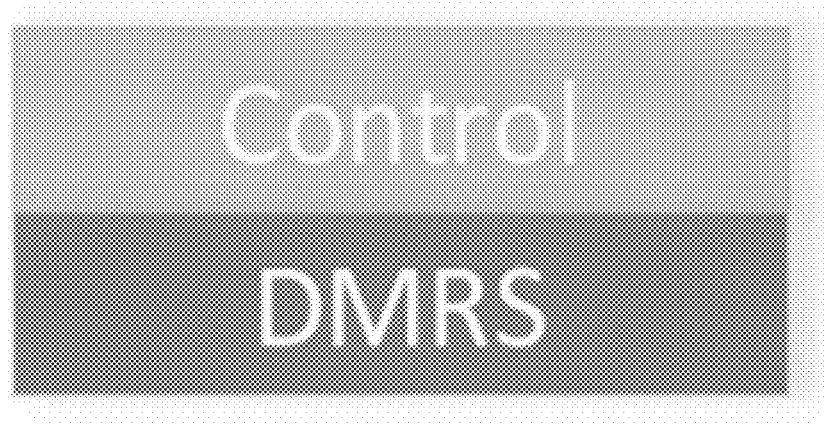
TDM multiplexing of DMRS and PDCCH in a cluster
Figure 2

Slot duration = 7.80us for 1.92MHz subcarrier spacing

A symbol

CONTROL RESOURCE SET CONFIGURATION AND PHYSICAL DOWNLINK CONTROL CHANNEL DESIGN FOR ABOVE 52.6GHZ

CROSS REFERENCE TO RELATED APPLICATION

The present application is a continuation of U.S. patent application Ser. No. 17/108,876, which was filed Dec. 1, 2020, which claims priority to U.S. Provisional Patent Application No. 62/942,664, which was filed Dec. 2, 2019; U.S. Provisional Patent Application No. 62/942,643, which was filed Dec. 2, 2019; the disclosures of which are hereby incorporated by reference.

FIELD

Embodiments relate generally to the technical field of wireless communications.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

In NR Release 15, system design is targeted for carrier frequencies up to 52.6 GHz with a waveform choice of cyclic prefix—orthogonal frequency-division multiplexing (CP-OFDM) for the downlink (DL) and uplink (UL), and additionally, Discrete Fourier Transform-spread-OFDM (DFT-s-OFDM) for UL. However, for carrier frequency above 52.6 GHz, it is envisioned that single carrier based waveform is needed in order to handle issues including low power amplifier (PA) efficiency and large phase noise.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates time-division multiplexing (TDM) of demodulation reference signal (DMRS) and physical downlink control channel (PDCCH) in a cluster, in accordance with various embodiments.

FIG. 10 shows an example with 1.92 Mega-Hertz (MHz) subcarrier spacing and 7.80 microsecond (μs) slot duration.

FIG. 14 illustrates an example of a 2-dimension resource allocation, in accordance with various embodiments.

FIG. 15 illustrates an example of a 1-dimension resource allocation, in accordance with various embodiments.

FIG. 20 illustrates another example of a fixed PTRS transmission pattern in remaining CCEs, in accordance with various embodiments.

FIG. 21 illustrates an example of CCE numbering considering PTRS, in accordance with various embodiments.

DETAILED DESCRIPTION

Figure 1:
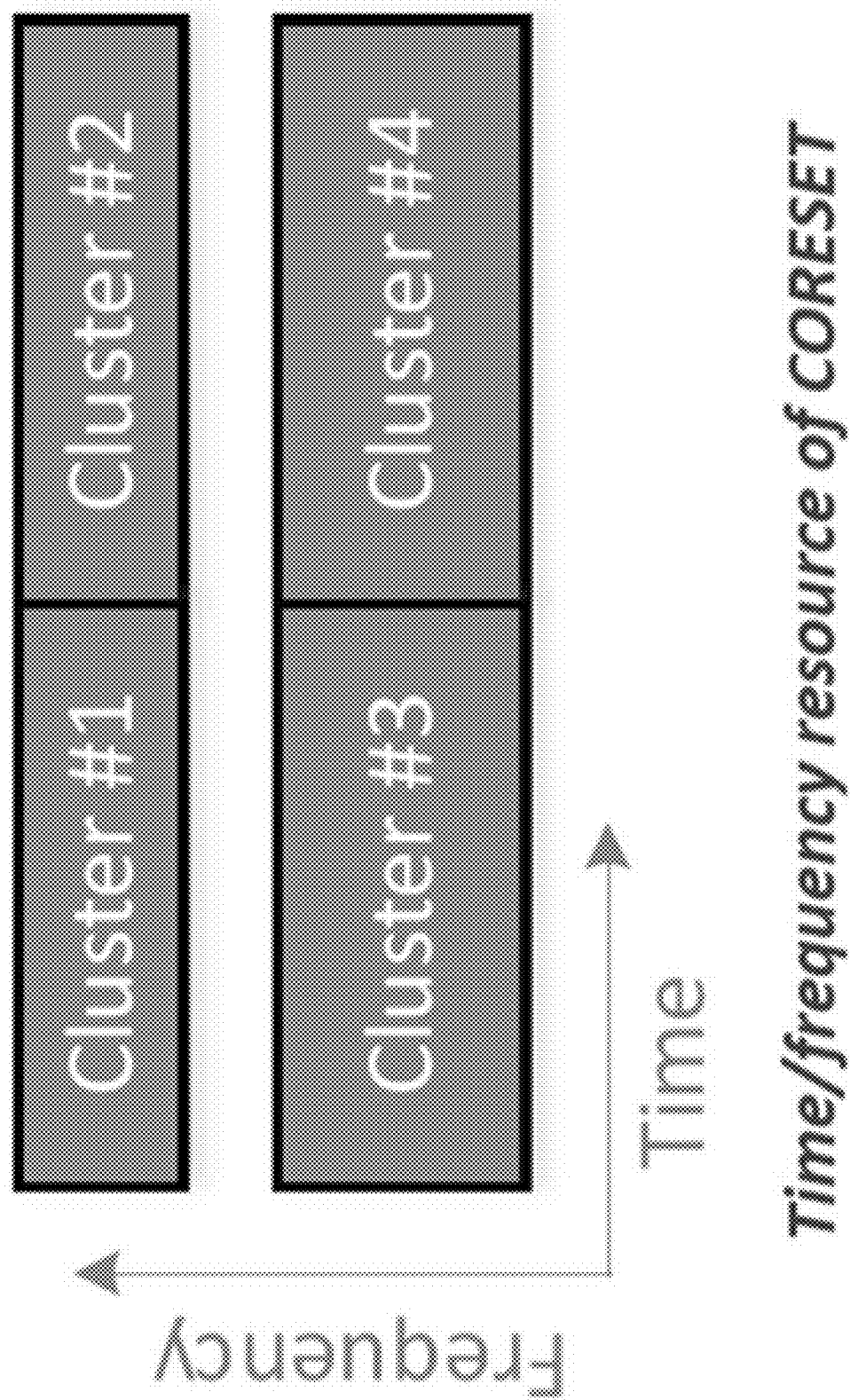
FIG. 1 illustrates time/frequency resources of a control resource set (CORESET) in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

This disclosure describes detailed control resource set (CORESET) configuration and physical downlink control channel (PDCCH) design for system operating above 52.6 GHz carrier frequency. Embodiments provide detailed design for the CORESET structure to support multiple precoders for a PDCCH. The Discrete Fourier Transform (DFT) size of control could be different from DFT size of data. Additionally, this disclosure describes detailed design for channel multiplexing of control and data transmission for system operating above 52.6 GHz carrier frequency.

Coreset Configuration and PDCCH Design

For single carrier waveform, DFT-spread (s)-orthogonal frequency division multiplexing (OFDM) and single carrier with frequency domain equalizer (SC-FDE) can be considered for both downlink (DL) and uplink (UL). For OFDM-based transmission scheme including DFT-s-OFDM, a cyclic prefix (CP) is inserted at the beginning of each block, where the last data symbols in a block is repeated as the CP. Typically, the length of CP exceeds the maximum expected delay spread in order to overcome the inter-symbol interference (ISI). For system operating above 52.6 GHz carrier frequency, when single carrier waveform including DFT-s-OFDM waveform is applied for DL transmission, e.g., for physical downlink control channel (PDCCH), certain design changes are needed compared to 3GPP Rel-15.

This disclosure describes detailed control resource set (CORESET) configuration and PDCCH design for system operating above 52.6 GHz carrier frequency. Embodiments provide detailed design for the CORESET structure to support multiple precoders for a PDCCH. The DFT size of control could be different from DFT size of data.

In NR, a control resource set (CORESET) is a set of time/frequency resources carrying PDCCH transmissions. A CORESET is divided into multiple resource element groups (REGs). A REG consists of time/frequency resource in one physical resource block (PRB) in one symbol. 6 REGs form a control channel element (CCE). A PDCCH candidate with aggregation level (AL) L includes L CCEs. 2, 3 or 6 REGs form a REG bundle. The REGs in a REG bundle use the same precoder, while different REG bundles may have different precoders.

For a single carrier waveform, the concept of CCE and REG could be reused which can be defined in time domain. For single carrier frequency domain equalizer (SC-FDE), the CCE/REG of different PDCCH candidates could be multiplexed by time-division multiplexing (TDM) directly. For DFT-S-OFDM, the CCE/REG of different PDCCH candidates could be multiplexed by TDM on the modulation symbols prior to pre-DFT operation. Each REG could include one or multiple modulation symbols. If a REG has only one modulation symbol, it is equivalent that concept of REG is not used in the PDCCH transmission for single-carrier waveform.

CORESET Configuration

In a single carrier waveform, a block of modulation symbols which are transformed by a DFT for frequency domain processing must have the same precoder. Further, it is hard to employ frequency-division multiplexing (FDM) multiplexing using same antenna elements without impact of peak to average power ratio (PAPR).

In one embodiment, a CORESET could include X clusters of time/frequency resources, X≥1. For both DMRS and PDCCH transmission, the separated DFT processing is applied to each cluster. The separate DFT may have same or different DFT size. The different clusters could have different precoders. For example, if the different clusters are transmitted with different panels of the antenna, it doesn't increase PAPR even when multiple clusters are FDM or spatial multiplexed.

In one option, the X clusters of a CORESET could be individually configured by high layer signaling.

In one option, M sets of frequency resources and N sets of time resources are configured for a CORESET. The number of PRBs in each set of frequency resource could be same or different. A cluster is then jointly determined by a set of frequency resource and a set of time resource. Consequently, the CORESET includes of X=M·N clusters. As shown in FIG. 1, a CORESET could include 4 clusters by configuring two sets of frequency resource and two sets of time resources.

In one embodiment, each cluster of a CORESET has dedicated DMRS for the channel estimation of the control channel in the same cluster. The DFT size for DMRS and associated control could be same or different.

In one option, for each cluster of a CORESET, time division multiplexing (TDM) could be used for the multiplexing of DMRS and control. The DMRS is used as phase reference for the demodulation of control in the same cluster. A cluster could have one symbol for DMRS, e.g. the first symbol in the cluster. A cluster could have one or more symbols for control channel transmission. As show in FIG. 2, two examples with 1 symbol or 2 symbols for control are provided.

Figure 3:
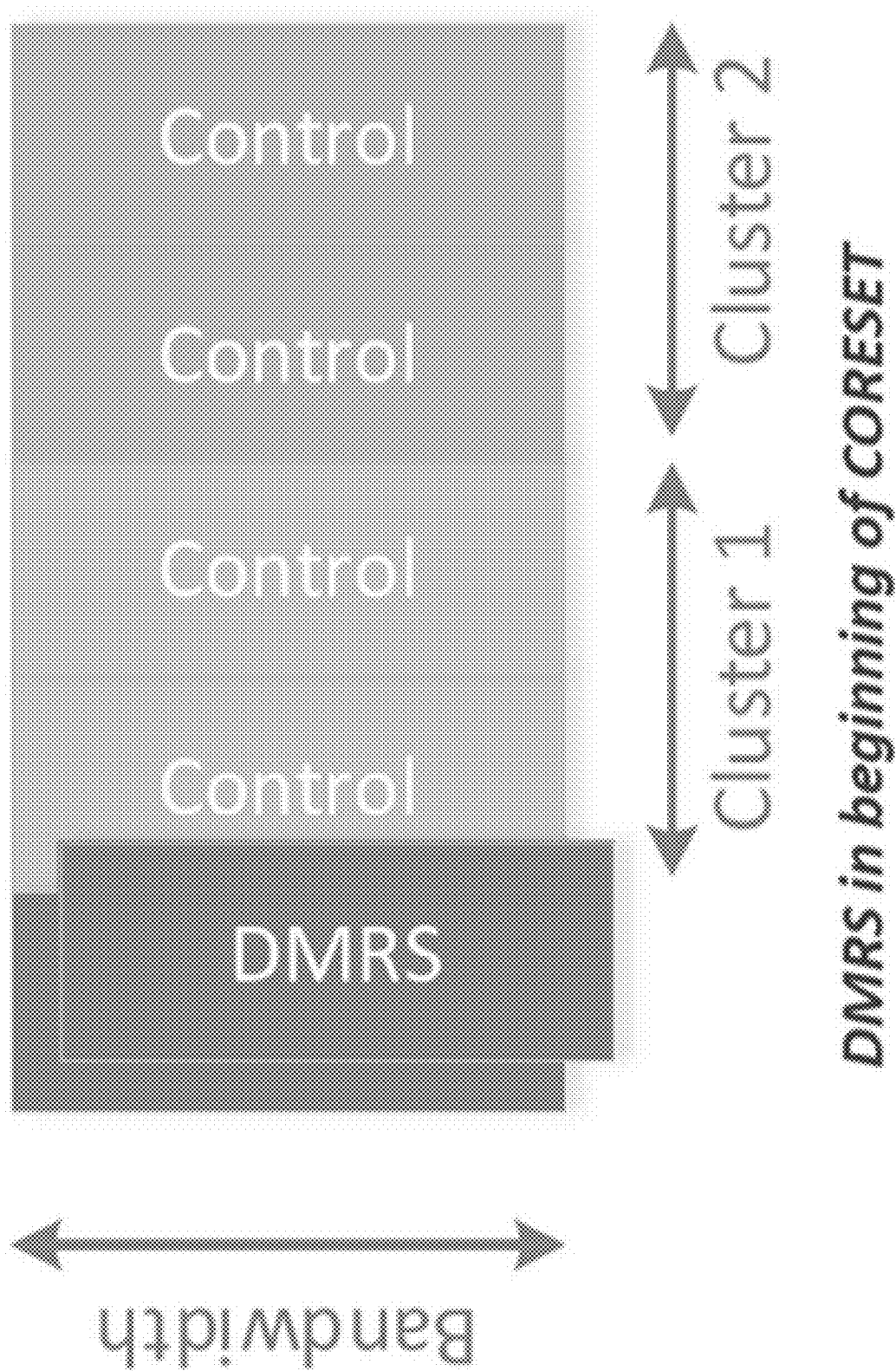
FIG. 3 illustrates a DMRS at beginning of a CORESET, in accordance with various embodiments.

In one option, if multiple sets of time resources are configured for a CORESET, the DMRS of multiple clusters using same sets of frequency resources may be transmitted in the beginning of the CORESET, while control channel of the multiple clusters are multiplexed by TDM after DMRS of the CORESET. As shown in FIG. 3, assuming 2 sets of time resources are configured, two clusters of a CORESET are multiplexed by TDM. DMRS for the two clusters are transmitted in the first symbol of the CORESET by FDM or CDM or TDM.

In one embodiment, a CCE could be mapped to the REGs located in multiple clusters for diversity. Alternatively, a CCE is defined within a cluster and a PDCCH candidate with AL>1 is mapped to the CCEs located in multiple clusters. The above multiple clusters could have different frequency or different precoders.

In one option, the modulation symbols of all the CCEs are firstly concatenated by its CCE indexes. Secondly, an interleaving is performed on a REG level or modulation symbol level. Thirdly, the interleaved modulation symbols are separated and mapped to each cluster of the CORESET.

Different DFT Size for Control and Data Channel

In NR, the OFDM symbol carrying a PDCCH or carrying a PDSCH have the same numerology in self scheduling case. However, it enforces restrictions on PDCCH transmission if same scheme applies to single carrier waveform. In one aspect, a same precoder must be applied to all modulation symbols which are transformed by a same DFT for frequency domain processing. That is, the same precoder is applied to a large number or all CCEs which limits the possibility for spatial processing of PDCCH. In the other aspect, since TDM of DMRS and control needs be used for PAPR reduction, the minimum resource allocation in time domain is 2 symbols, which has a DMRS overhead of 50%.

In one embodiment, for the PDCCH transmission, the DFT size for frequency processing could be separately determined from the DFT size of data transmission. For example, a slot can contain 14 symbols following DFT size of data transmission. A CORESET could be configured on certain symbol(s) in the slot, e.g. the first symbol(s). Within the CORESET, DFT size for PDCCH is applied. That is, the time resource of the CORESET is divided into multiple blocks according to DFT size of PDCCH. Within a CORESET, the precoder for the modulation symbols of different DFT transform could be same or different. By adopting a DFT size for DMRS and control in a CORESET different from DFT size of data, it is also beneficial for the resource efficiency of PDCCH transmissions.

In one option, a separate DFT is performed per CCE. Therefore, a dedicated CP should be added for each CCE. It is possible to apply a different precoder for each CCE, however, the DMRS with the same precoder has to be transmitted accordingly.

Figure 5:
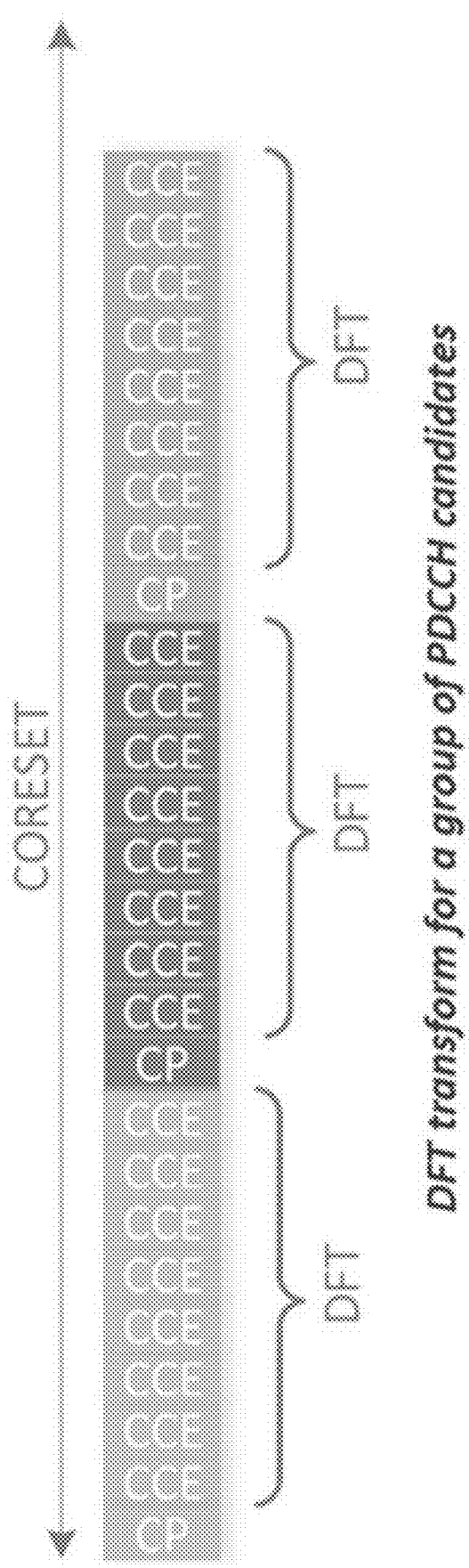
FIG. 5 illustrates an example of Discrete Fourier Transform (DFT) for a group of physical downlink control channel (PDCCH) candidates, in accordance with various embodiments.

In one option, a separate DFT is performed for a group of D consecutive CCEs. That is, DFT size equals to $D \cdot M_{CCE}$, $M_{CCE}$ is the number of modulation symbols of a CCE. The DFT size, equivalently value D is predefined or high layer configured. A CP could be added for the D consecutive CCEs for frequency domain processing. A CORESET could be divided into multiple groups of D consecutive CCEs plus associated CP. A different precoder may be used on different groups of D CCEs respectively. In the above option, the last group of CCEs may be less than D. Though DFT is performed per each group of D consecutive CCEs, all the CCEs in a CORESET can still be continuously indexed, so that PDCCH search space is defined on the CCEs. A PDCCH candidate may be mapped to CCEs of same DFT transform or separated and mapped to CCEs of different DFT transform. Specifically, if D equals to $2^d$, the option can also be expressed as that, a separate DFT is performed assuming PDCCH AL D. The D consecutive CCEs could form D PDCCH candidates of AL 1, D/2 PDCCH candidates of AL 2, . . . or one PDCCH candidate of AL D. for a PDCCH candidate AL larger than D, it could be generated by combining the CCEs transmitted by different DFT. As shown in FIG. 5, DFT size equals to number of modulation symbols of 8 CCEs. A CP is added for each group of 8 CCEs. The 24 CCEs in the CORESET shown in FIG. 5 could be indexed from 0 to 23. For PDCCH AL 1, 2, 4, 8, such a PDCCH candidate is using a single DFT. For PDCCH AL 16, it could be generated by 16 CCEs of two separate DFT, e.g. the first two DFT.

In one embodiment, in accordance with the above option using a separate DFT for each group of D consecutive CCEs, the associated DMRS needs to be transmitted. The DFT size for the associated DMRS could be same or different from the DFT size of D consecutive CCEs.

In one option, the multiple DMRS corresponding to the multiple groups of D consecutive CCEs are transmitted in the beginning of CORESET. FDM or CDM could be used to generate multiple DMRS ports each of which is used for a group of D consecutive CCEs.

Figure 6:
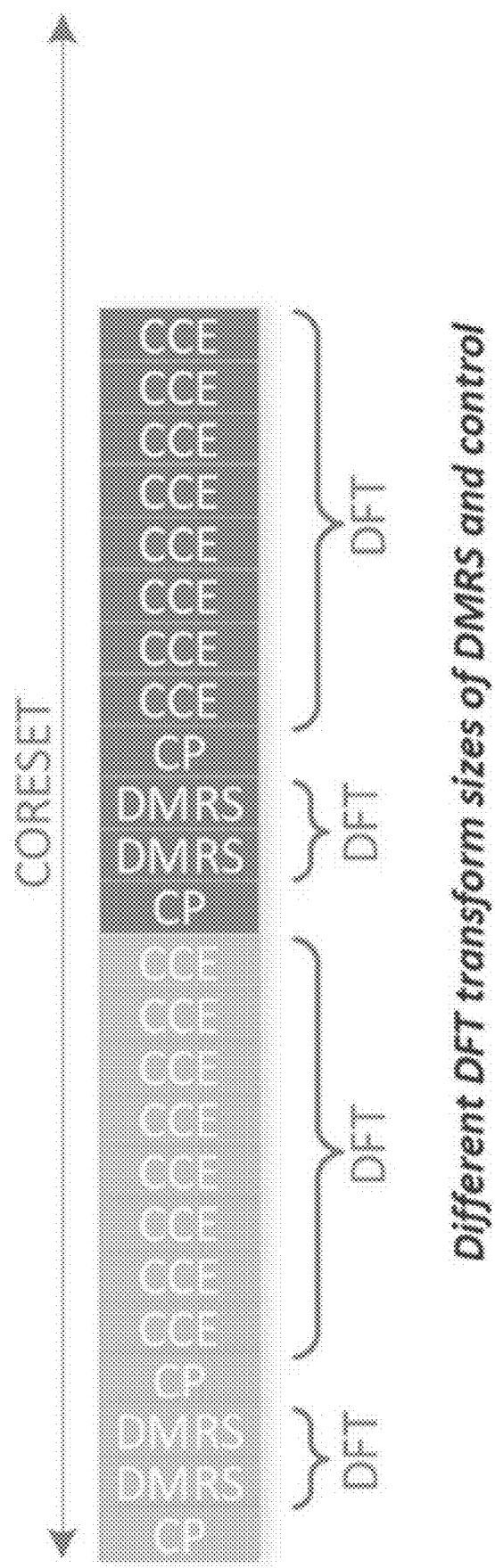
FIG. 6 illustrates an example of different DFT sizes of DMRS and control resources, in accordance with various embodiments.

In one option, the DMRS corresponding to each group of D consecutive CCEs is transmitted right before the D consecutive CCEs. The DFT size for DMRS could be much lower than DFT size of D consecutive CCEs for DMRS overhead reduction. As shown in FIG. 6, DFT size for the control corresponds to 8 CCEs, while the DFT size of DMRS corresponds to 2 CCEs.

Different Size of PDCCH and Associated DMRS

Embodiment of different size of PDCCH and associated DMRS are provided as follows:

In one embodiment, same bandwidth is allocated for the transmission of each PDCCH candidate and its associated DMRS. In this case, DFT size and the length of DMRS sequence in frequency can be determined by the aggregation level for each PDCCH candidate. For instance, if only 1 symbol is allocated for the transmission of PDCCH, and aggregation level (AL) of one PDCCH candidate is 1, then the aggregation level is the DFT size which is applied for the transmission of the PDCCH candidate. If 2 symbols are allocated for the transmission of PDCCH, the DFT size can be AL/2 if time first mapping is applied for the transmission of PDCCH.

Figure 7:
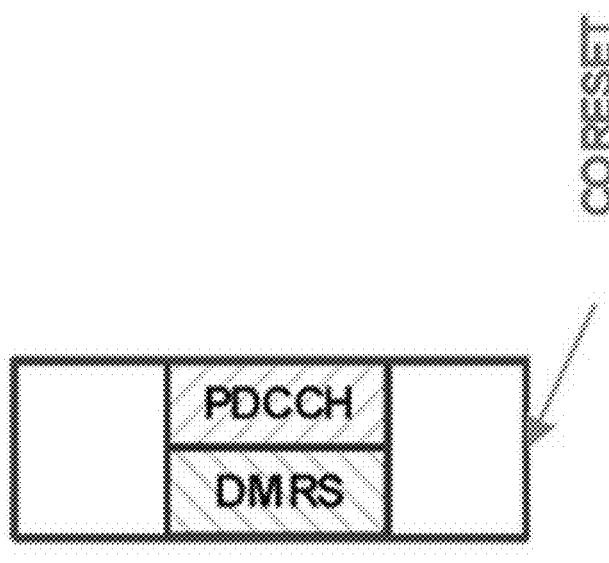
FIG. 7 illustrates an example of a PDCCH candidate and associated DMRS with a same bandwidth, in accordance with various embodiments.

Further, UE needs to perform the channel estimation based on the DMRS on possible location of PDCCH candidate and subsequently attempt to decode the PDCCH candidate. FIG. 7 illustrates one example of same bandwidth for each PDCCH candidate and associated DMRS.

In another embodiment, same bandwidth is allocated for the transmission of all potential PDCCH candidates and DMRS. This may help enable time division multiplexing (TDM) of multiple PDCCHs in time domain prior to DFT operation. In some cases, zero power or dummy data may be inserted in time prior to DFT operation.

Figure 8:
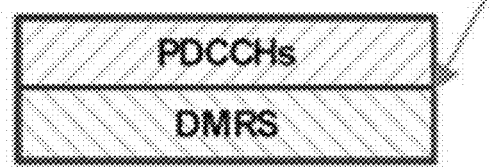
FIG. 8 illustrates an example of the same bandwidth for transmission of all potential PDCCH candidates and DMRS, in accordance with various embodiments.

For this option, the bandwidth of DMRS transmission may be equal to the CORESET bandwidth in frequency or search space set in frequency domain or bandwidth of initial or active bandwidth part. In this case, UE may only need to perform channel estimation once for all potential PDCCH candidates and subsequently attempt to decode PDCCH candidates in time domain. FIG. 8 illustrates one example of same bandwidth for the transmission of all potential PDCCH candidates and DMRS.

In another embodiment, different bandwidth may be allocated for the transmission of each PDCCH candidate and DMRS. In particular, larger bandwidth can be allocated for the transmission of DMRS than the bandwidth allocated for the transmission of PDCCH candidate. Similar to the above option, the bandwidth of DMRS transmission may be equal to the CORESET bandwidth in frequency or search space set in frequency domain or bandwidth of initial or active bandwidth part.

Figure 9:
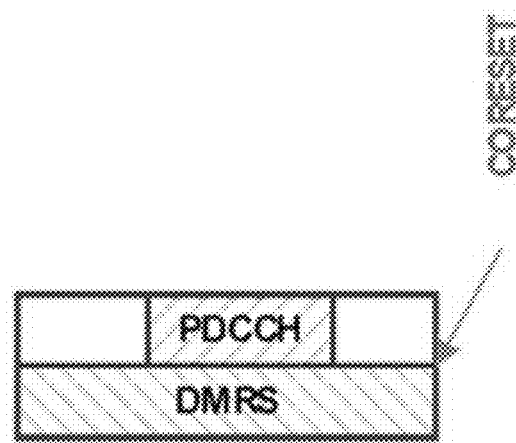
FIG. 9 illustrates an example of different bandwidth for transmission of each PDCCH candidate and DMRS, in accordance with various embodiments.

Note that for this option, DFT size for the transmission of each PDCCH candidate or the bandwidth of each PDCCH candidate may be determined by the aggregation level for each PDCCH candidate. FIG. 9 illustrates one example of different bandwidth for the transmission of each PDCCH candidate and DMRS.

Channel Multiplexing of Control and Data Transmission

Various For system operating above 52.6 GHz carrier frequency, it is envisioned that single carrier based waveform is needed in order to handle issues including low power amplifier (PA) efficiency and large phase noise. Discrete Fourier Transform (DFT)-spread (s)-orthogonal frequency division multiplexing (OFDM) (DFT-s-OFDM) and single carrier with frequency domain equalizer (SC-FDE) can be considered for both DL and UL.

Figure 10:
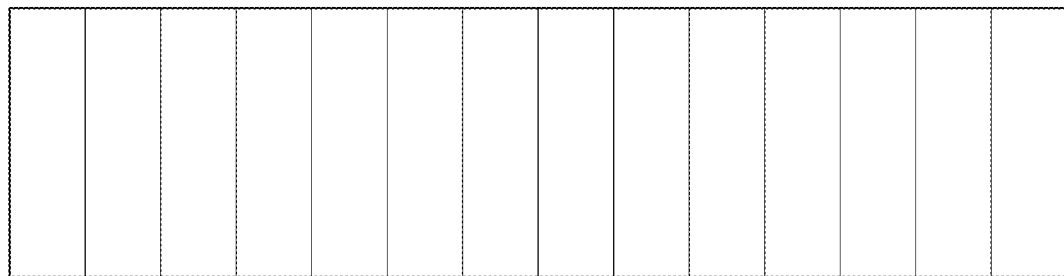
FIG. 10 illustrates an example of short slot duration for larger subcarrier spacing, in accordance with various embodiments.

However, there is more restriction regarding channel multiplexing. Time division multiplexing (TDM) is always possible, while frequency division multiplexing (FDM)/spatial division multiplexing (SDM) can only be used in certain conditions, e.g. when multiple panels are equipped. In fact, subcarrier spacing (SCS) could be quite large for high frequency, e.g., 1.92 MHz or 3.84 MHz is employed, the slot duration can be very short. For instance, for 1.92 MHz subcarrier spacing, one slot duration is approximately 7.8 μs as shown in FIG. 10. This extremely short slot duration makes TDM based multiplexing more promising. How to efficiently support channel multiplexing is a critical issue for the system design with high frequency.

Embodiments herein provide detailed design for channel multiplexing of control and data transmission for system operating above 52.6 GHz carrier frequency.

Single Carrier Waveform Includes SC-FDE and DFT-S-OFDM

For single-carrier waveform SC-FDE, a set of consecutives modulation symbols could be transformed by a DFT for frequency domain processing. This set of consecutives modulation symbols form a SC symbol. A CP can be added to a SC symbol to enable DFT processing. Alternatively, a unique word (UW) is included in a SC symbol. Channel multiplexing could apply within the set of modulation symbols of a SC symbol.

For DFT-S-OFDM, a set of modulation symbols are inputted to pre-DFT and then mapped to a set of continuous PRBs in the carrier bandwidth. Specifically, the set of continuous PRBs could equal to or smaller than the carrier bandwidth. Channel multiplexing could be realized in frequency domain by occupying different PRBs. However, it would increase the PAPR. Further, channel multiplexing could be realized within the set of modulation symbols prior to pre-DFT. In this disclosure, we focus on channel multiplexing prior to pre-DFT, which is considered as a kind of TDM based multiplexing. A DFT-S-OFM symbol is named as a SC symbol, which consists of a set of modulation symbols prior to pre-DFT. In the following, the pre-DFT operation is not specially mentioned for a DFT-S-OFDM symbol, unless stated otherwise.

In the following, a SC symbol is also referred as a symbol unless stated otherwise.

Channelization for Control and Data

Resource allocation is normally performed in time domain and frequency domain. In a system with single carrier waveform, the granularity of time domain resource allocation can be in a symbol level or sub-symbol level. On the other hand, there is restriction on the freedom for frequency domain resource allocation for single-carrier waveform. The frequency resource allocation could be fixed to the bandwidth part (BWP) bandwidth. The parameters of BWP including BWP bandwidth is predefined or up to high layer configuration.

In one embodiment, for the resource allocation in time domain, a symbol could be divided into N time units (TUs) with each TU consists of M modulation symbols. For example, M equals to 12 to align with a PRB in NR. The N TUs could be indexed from 0 to N−1.

Figure 11:
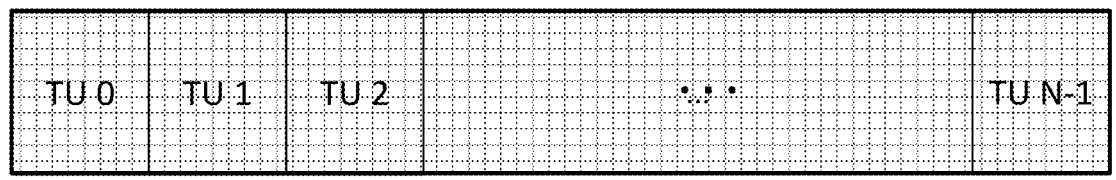
FIG. 11 illustrates an example of localized time unit (TU) mapping in a symbol, in accordance with various embodiments.

In a first option, as shown in FIG. 11, a TU may be directly mapped to M consecutive modulation symbols in a SC symbol, e.g. localized TU mapping.

Figure 12:
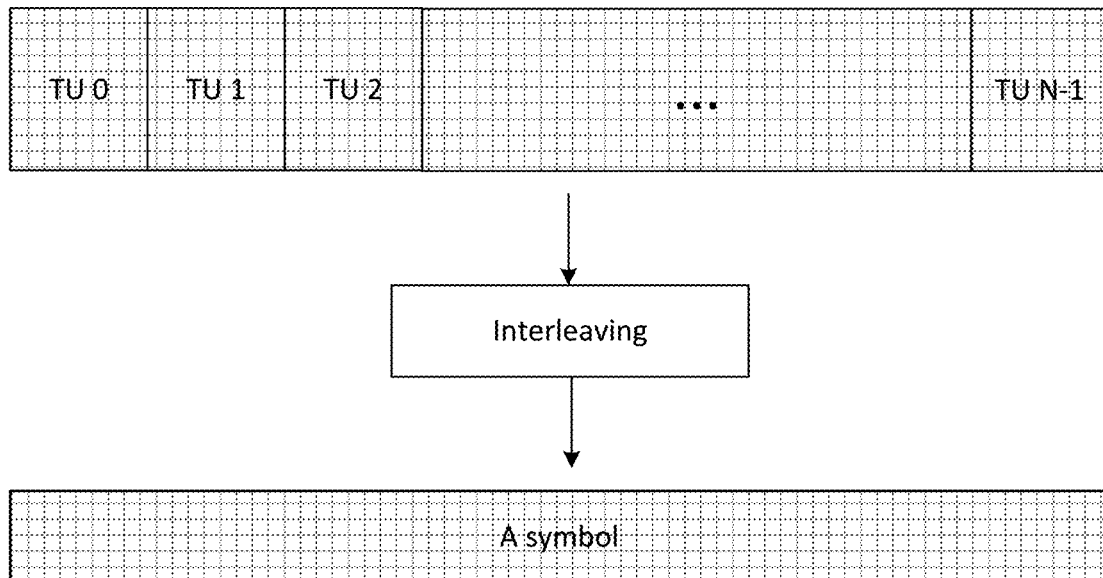
FIG. 12 illustrates an example of distributed TU mapping in a symbol, in accordance with various embodiments.

In a second option, as shown in FIG. 12, all TUs may be ordered by a TU index and mapped to modulation symbols in a SC symbol after interleaving operation, e.g. distributed TU mapping. The granularity of interleaving could be X modulation symbols. e.g. X equals to 1. Or X equals to 12, e.g. interleaving is operated on TU level, or X could be another number, which can be predefined in the specification or configured by higher layers. In another option, X can be determined in accordance with allocated bandwidth for data transmission. The interleaving pattern could be common to all SC symbols in a slot. Alternatively, the interleaving pattern could be respectively determined for each SC symbol in a slot. The latter method has the benefit to randomize interference and to average the impact on rate matching of phase tracking reference signal (PTRS) which could be mapped to fixed modulation symbols in a SC symbol.

Figure 13:
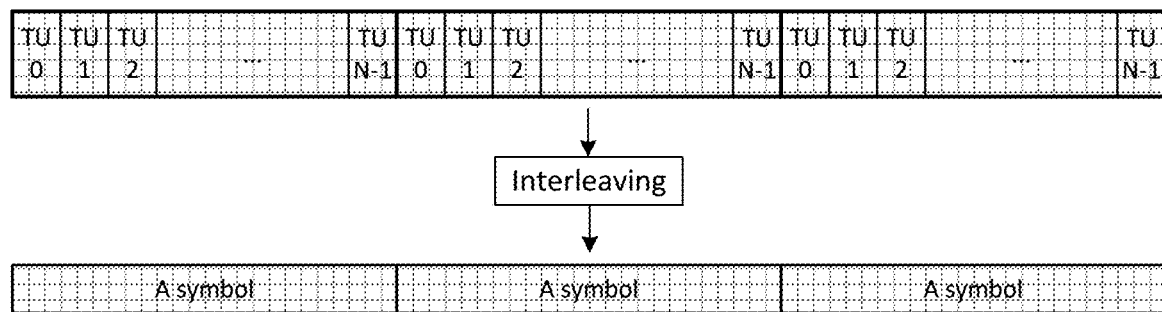
FIG. 13 illustrates an example of distributed TU mapping in a data transmission duration, in accordance with various embodiments.

In a third option, as shown in FIG. 13, all the TUs of multiple consecutive SC symbols may be concatenated, interleaved and then mapped to modulation symbols in the consecutive SC symbols, e.g. distributed TU mapping across SC symbols. The granularity of interleaving could be X modulation symbols. e.g. X equals to 1. Or X equals to 12, e.g. interleaving is operated on TU level, or X could be another number, which can be predefined in the specification or configured by higher layers. In another option, X can be determined in accordance with allocated bandwidth for data transmission. In a TDM based multiplexing of DMRS and data symbols, e.g. DMRS is mapped to the first PDSCH symbol and the remaining PDSCH symbols are for data transmission, the interleaving in the latter case can average the impact of channel estimation.

In one embodiment, resource allocation may be done in a granularity of TU.

Figures 14, 15:
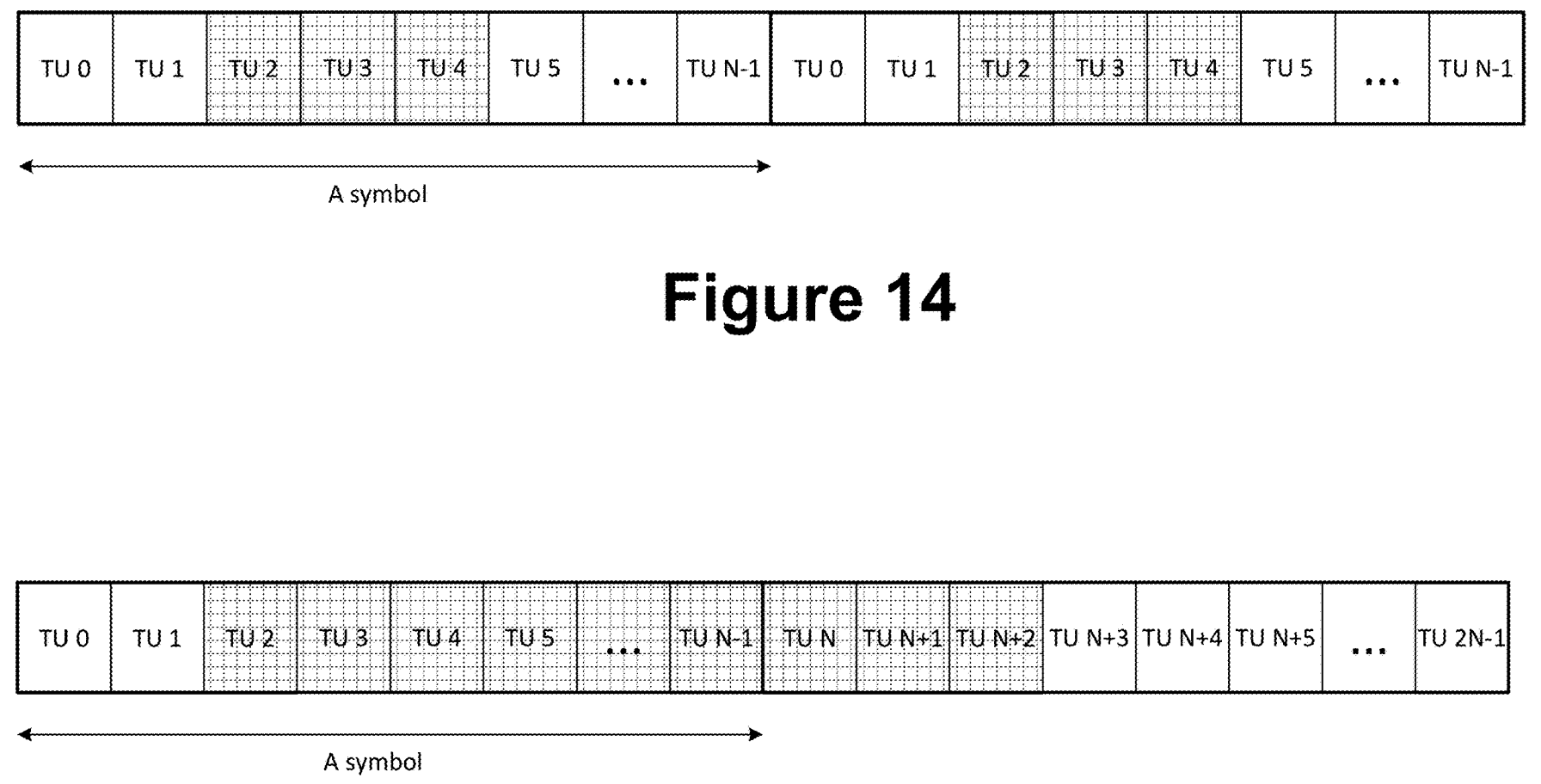

In a first option, a two dimension resource allocation (RA) is applied for PDSCH or PUSCH resource allocation (RA). Firstly, a set of consecutive symbols are allocated, e.g. by indicating a start symbol and number of symbols. Secondly, a set of TUs within each allocated symbol, e.g. by indicating a start TU and number of TUs. For example, as shown in FIG. 14, the allocated resource for a UE could be consecutive TU3-TU5 within two continuous symbols. Assuming multiple groups of consecutive symbols are allocated as PTRS in a symbol and the position of each group is common to all symbols, the second and third options for TU mapping could avoid a particular resource allocation of a UE is always punctured by PTRS.

In a second option, for PDSCH or PUSCH resource allocation (RA), a one-dimension RA on TU level could be employed. The TUs within one or multiple consecutive symbols e.g. in a slot could be sequentially numbered, so that a starting TU index and a number of allocated TUs could indicate the allocated resource. As shown in FIG. 15, the resource allocation can occupy consecutive TUs starting from TU 2 in a symbol and ends at TU N+2 in a later symbol. Note that for this one dimension resource allocation, after DFT operation, the set of modulation symbols are mapped to the configured resource in frequency domain. In one option, the configured resource in frequency can be the BWP.

In one embodiment, in according with the above two options for PDSCH resource allocation on granularity of TU, DMRS for the PDSCH transmission could be always transmitted in full bandwidth, the bandwidth of configured DL BWP, or a configured bandwidth by RRC within the configured BWP. The DMRS could be shared by one or multiple PDSCHs allocated by e.g. the above two options. The DMRS could be transmitted in the first symbol of the allocated PDSCH. Alternatively, the DMRS could be transmitted immediately before the first symbol of the allocated PDSCH. one or more additional DMRS symbol(s) may be transmitted depending on the length of allocated PDSCH which could be configured by RRC.

Multiplexing for Control and Data

In 3GPP NR Rel-15, PDCCH and PDSCH can be multiplexed in a FDM manner in a same OFDM symbol. In this case, a PDSCH can be rate-matched around the PDCCH scheduling the PDSCH. However, for single waveform, FDM based multiplexing may not be desirable due to PAPR issue. Embodiments of multiplexing of PDCCH and PDSCH for above 52.6 GHz carrier frequency are provided as follows:

In one embodiment, for a given UE, PDCCH and PDSCH with single carrier waveform may be multiplexed in a TDM manner within a SC symbol. as in NR, denote the consecutive symbols and frequency resources as control resource set (CORESET).

Figure 16:
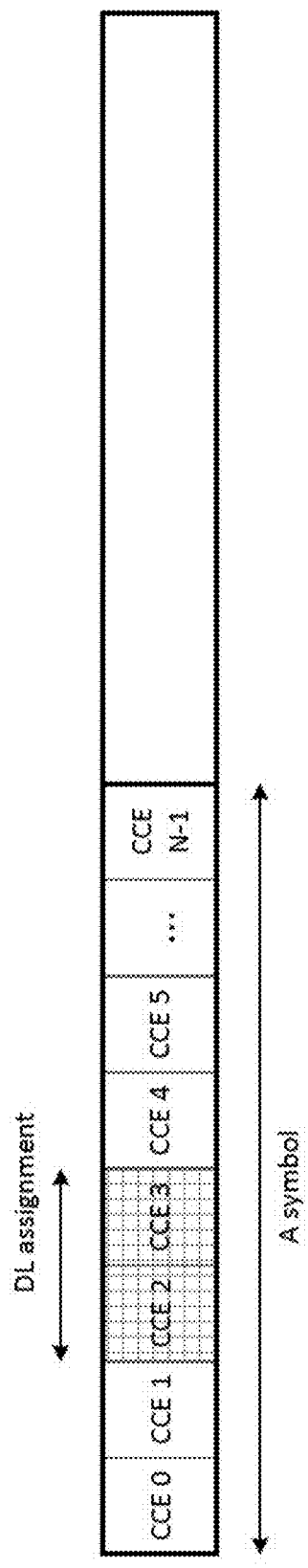
FIG. 16 illustrates an example of a physical downlink shared channel (PDSCH) rate matched around a PDCCH, in accordance with various embodiments.

In one option, if the allocated PDSCH resource overlaps with the CORESET carrying the associated PDCCH, the PDSCH is rate matched around the CCE occupied by the PDCCH and transmitted in a symbol in the CORESET. For example, as shown in FIG. 16, the CORESET is in the first symbol. UE detects its DL assigned in CCE 2 & CCE 3 which scheduled a PDSCH including the first symbol, the UE should assume PDSCH rate matched around CCE 2 & CCE 3 in the first symbol. That is, CCE 0, 1, 4, 5, . . . N−1 are all used for PDSCH transmission.

Note that the above option can be extended for the case when a CORESET spans more than 1 symbol, e.g., when a CORESET spans 2 or 3 symbols. When single-carrier waveform is applied for the transmission of PDCCH, DMRS and PDCCH can be multiplexed in a TDM manner. In this case, first symbol in a CORESET may be allocated for DMRS transmission. For rate-matching the PDSCH is rate-matched around the scheduled DCI and associated DMRS transmission.

Figure 17:
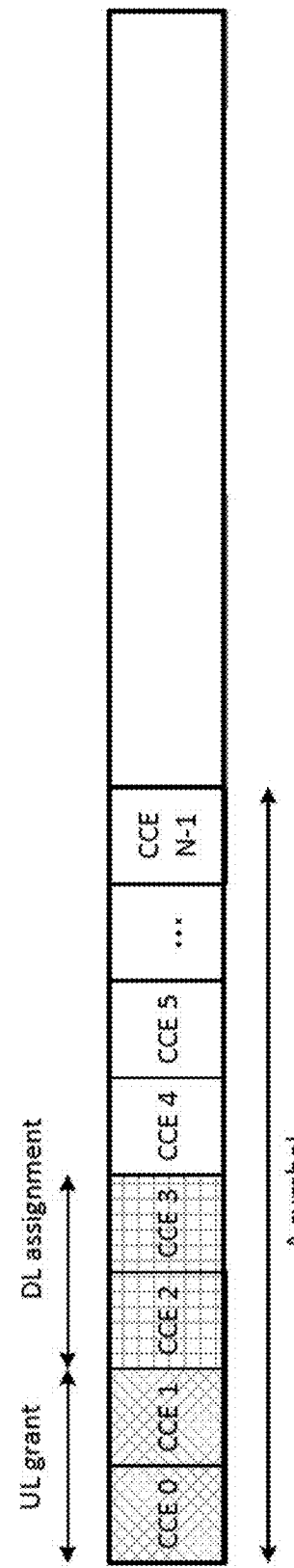
FIG. 17 illustrates another example of a PDSCH rate matched around a PDCCH, in accordance with various embodiments.

In one option, assuming a DL assignment and/or a UL grant could be transmitted in the CORESET, if the allocated PDSCH resource overlaps with the CORESET carrying the associated DL grant, the PDSCH is transmitted in a symbol in the CORESET which is rate matched around the CCE occupied by the DL grant and all CCEs with smaller CCE indexes than the CCE occupied by the DL grant. Alternatively, the PDSCH is transmitted in a symbol in the CORESET which is rate matched around the CCE occupied by the DL grant and all CCEs with larger CCE indexes than the CCE occupied by the DL grant. For example, as shown in FIG. 17, the CORESET is in the first symbol. UE detects its DL assignment DCI in CCE 2 & CCE 3 which schedules a PDSCH including the first symbol, the UE should assume PDSCH is rate matched around CCE 0-CCE 3 in the first symbol. That is, CCE 4, 5, . . . N−1 are all used for PDSCH transmission. The UE could assume CCE 1 & CCE 2 are occupied for other purpose, e.g. carrying a UL grant no matter if a UL grant is detected on CCE 0 & CCE 1. By implementation, if gNB doesn't intend to multiplex a UL grant, gNB may transmit DL assignment in CCE 0 & CCE 1.

In another option, the PDSCH is rate-matched around the DCI which includes both DL assignment and UL grant as well as associated DMRS.

In one option, in the above option illustrated with FIG. 8, a concept of search space could be introduced. In this case, a UE only detects PDCCH within its configured search space. The configured search space for a UE may not necessarily start from CCE 0. If a DL grant is detected in the search space and the allocated PDSCH resource overlaps with the CORESET carrying the DL grant, the PDSCH is transmitted in a symbol in the CORESET which is rate matched around the CCE occupied by the DL grant and all CCEs with smaller CCE indexes than the CCE occupied by the DL grant in the search space. Alternatively, the PDSCH is transmitted in a symbol in the CORESET which is rate matched around the CCE occupied by the DL grant and all CCEs with larger CCE indexes than the CCE occupied by the DL grant in the search space.

In one embodiment, when 1-layer transmission is applied for PDCCH and 2-layer transmission is applied for PDSCH, PDSCH can be either rate-matched around the CCEs for both layers or only transmitted one layer. In one example, assuming layer #0 is used for PDC CH transmission and layer #0 and #1 are used for PDSCH transmission, in the former option, PDSCH is rate-matched around the CCEs for both layer #0 and #1. In the latter option, PDSCH is rate-matched around the CCEs only for layer #0. In this case, PDSCH may still be transmitted on the layer #1, even on the time and frequency resource allocated for PDCCH transmission.

In one embodiment, when PDCCH and PDSCH are multiplexed by TDM within a SC symbol in a CORESET, the modulation order for the PDSCH transmission within the CORESET is set to the same modulation order as PDCCH, e.g. the modulation is limited to quadrature phase shift keying (QPSK) or pi/2 binary phase shift keying (BPSK) if employed. Alternatively, the modulation for the PDSCH transmission within the CORESET follows the modulation of PDSCH scheduled by the PDCCH, that is, high modulation order quadrature amplitude modulation (QAM) is allowed. In the latter case, phase tracking reference signal (PTRS) may need to be transmitted in the symbol in CORESET which can be used to assist phase noise compensation for the QAM modulation symbols of PDSCH.

Figure 18:
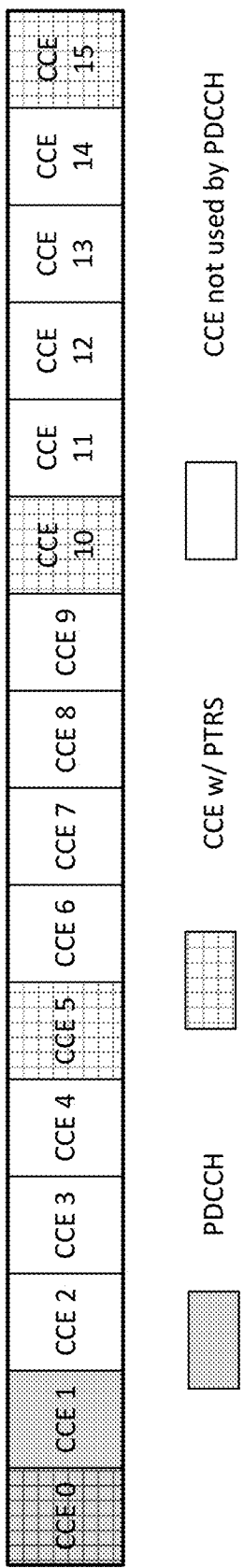
FIG. 18 illustrates an example of a fixed phase tracking reference signal (PTRS) pattern in a symbol, in accordance with various embodiments.

In one option, the modulation symbols used as PTRS in a symbol of a CORESET is of a fixed pattern, irrespective of PDCCH transmissions in the CORESET. As shown in FIG. 18, PTRS are always allocated in CCE 0, 5, 10, 15 no matter CCE 0, 5, 10, 15 are used for PDCCH transmission or not. The PDCCH transmission could rate matched around the modulation symbols in CCE 0, 5, 10, 15. Alternatively, rate matching is done by assuming all modulations symbol in a symbol of the CORESET are valid for PDCCH transmission and PTRS is transmitted by puncturing certain modulation symbols in CCE 0, 5, 10, 15.

Figure 19:
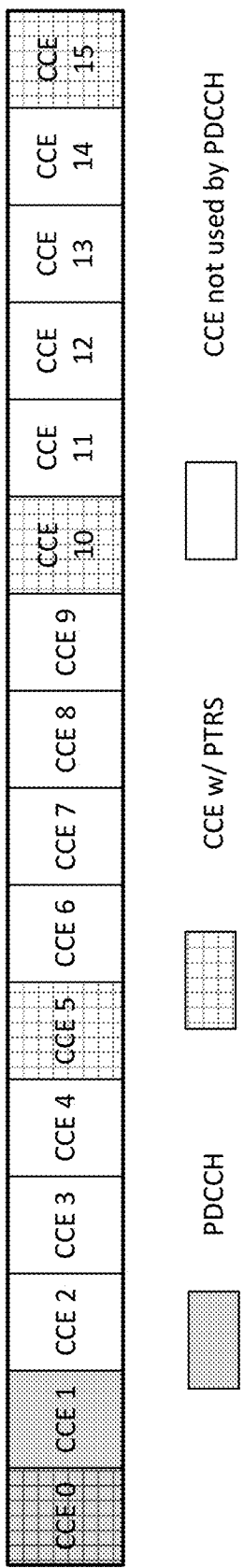
FIG. 19 illustrates an example of a fixed PTRS transmission pattern in remaining CCEs, in accordance with various embodiments.

In one option, the PTRS could be transmitted with a fixed pattern in a SC symbol if a CCE is not used for PDCCH transmission. That is, if a CCE is used for PDCCH transmission, PTRS is not transmitted even if the CCE carries a PTRS according to the fixed pattern. As shown in FIG. 19 the number of CCEs carrying PTRS is reduced to 3 if compared with FIG. 18. Since the first two CCEs are used by PDCCH, the PTRS in the first CCE is not transmitted.

The remaining PTRS is still transmitted according to the fixed pattern in the CCEs not used for the PDCCH transmission.

Figures 20, 21:
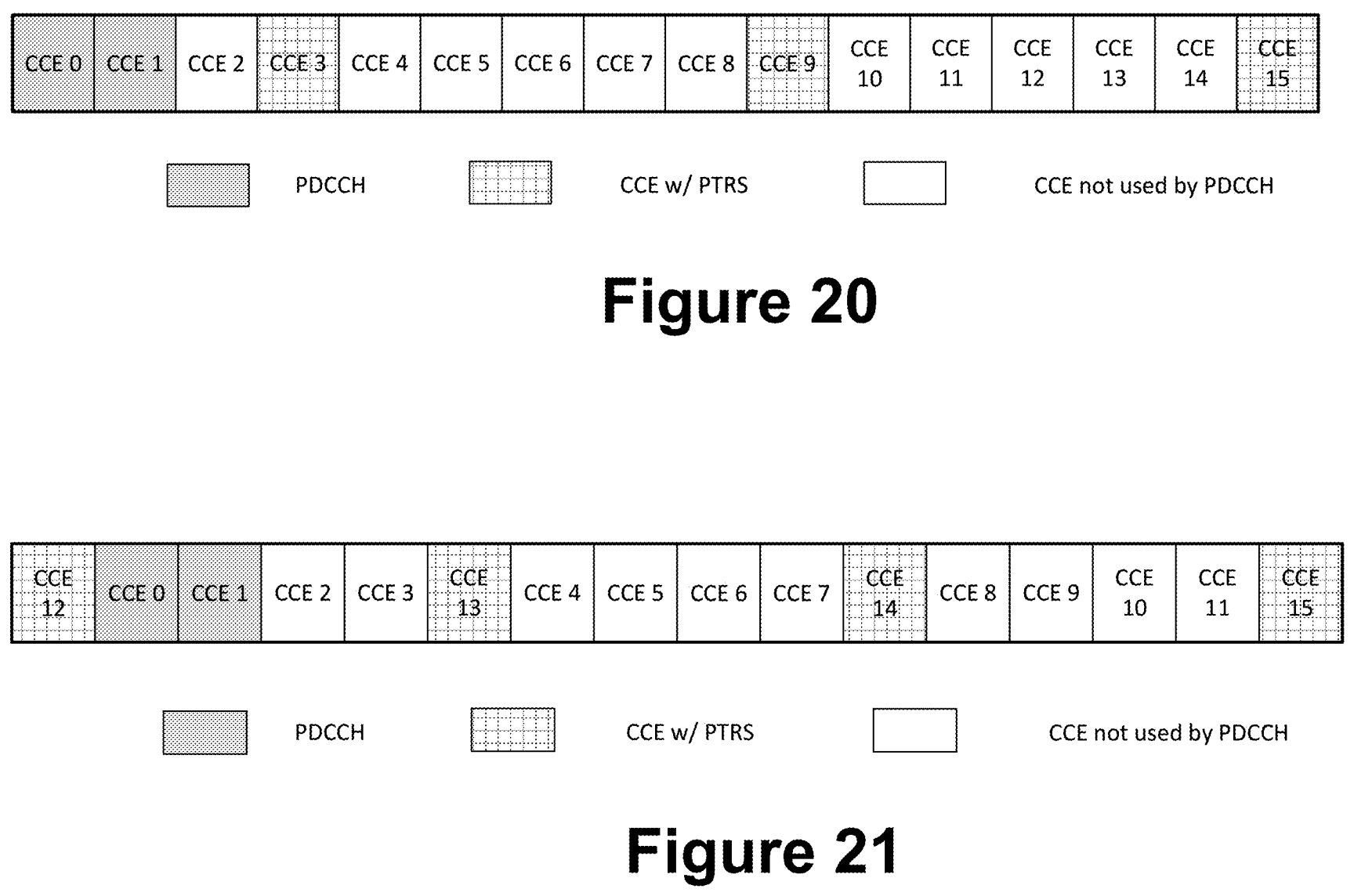

In one option, the PTRS, if transmitted, could follow a determined pattern by the remaining CCEs in a SC symbol. As shown in FIG. 20, assuming the first two CCEs are occupied for PDCCH transmission, an PTRS pattern could be derived by the remaining CCEs for PDSCH transmission. The determined PTRS pattern may be optimized for phase estimation/compensation for the PDSCH transmission on the remaining CCEs.

In one option, as shown in FIG. 21, when CCEs are numbered within a CORESET, the CCEs potentially used to carry PTRS are assigned with largest CCE indexes. By this way, if a PDCCH is first mapped to a CCE with small CCE indexes, and if PDCCH(s) is not using all CCEs in the CORESET, PDCCH(s) is likely mapped to CCEs without PTRS which avoids PTRS puncturing a PDCCH. When the allocated PDSCH resource overlaps with the CORESET carrying the associated DL grant, the CCEs with large CCE indexes are used for PDSCH transmission. PTRS are transmitted in the CCEs with large CCE indexes which could be used to improve PDSCH reception.

Systems and Implementations

Figure 22:
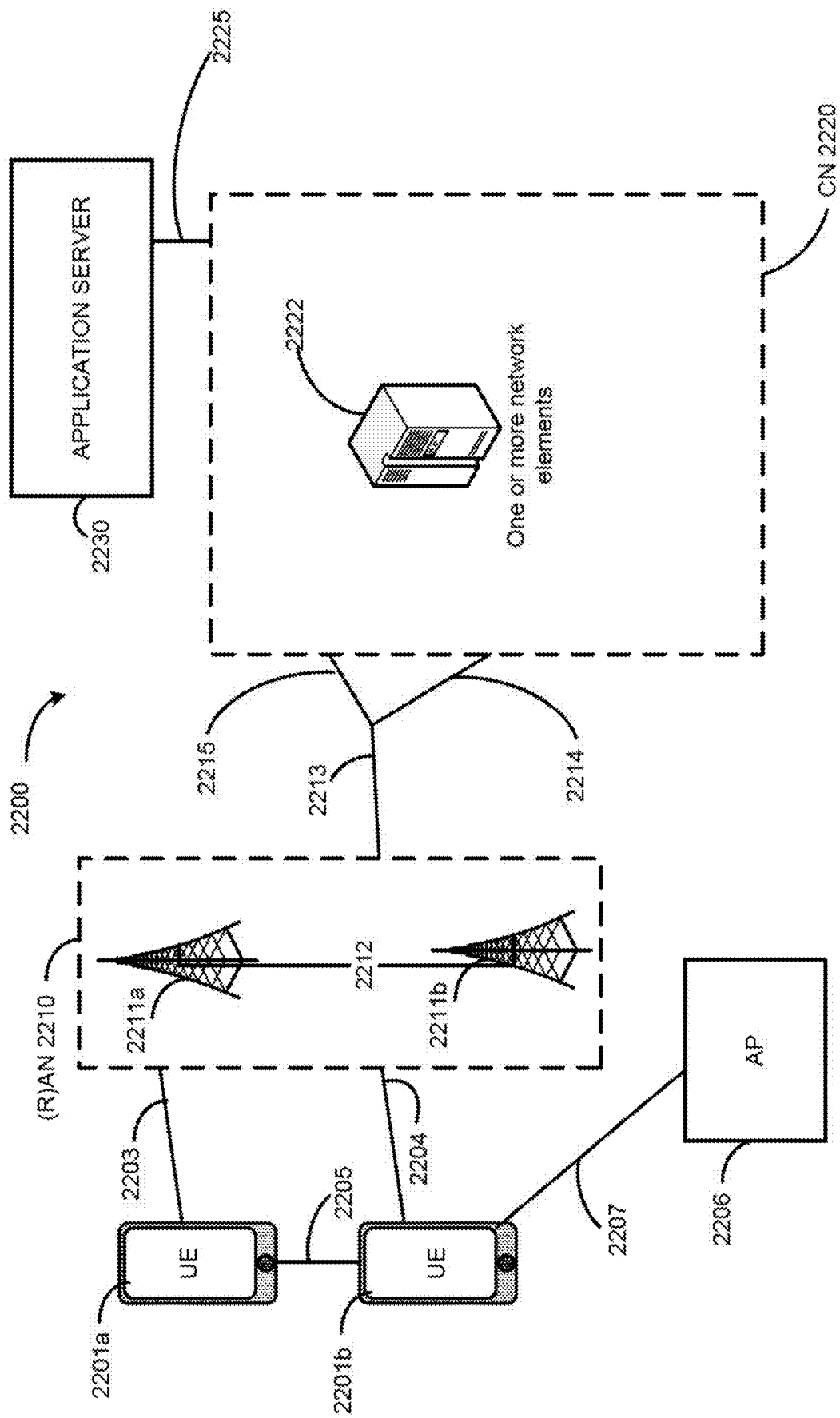
FIG. 22 illustrates an example architecture of a system of a network, in accordance with various embodiments.

FIG. 22 illustrates an example architecture of a system 2200 of a network, in accordance with various embodiments. The following description is provided for an example system 2200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 22, the system 2200 includes UE 2201*a* and UE 2201*b* (collectively referred to as "UEs 2201" or "UE 2201"). In this example, UEs 2201 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 2201 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2201 may be configured to connect, for example, communicatively couple, with an or RAN 2210. In embodiments, the RAN 2210 may be an NG RAN or a 5G RAN, an E-UTRAN, or a legacy RAN, such as a UTRAN or GERAN. As used herein, the term "NG RAN" or the like may refer to a RAN 2210 that operates in an NR or 5G system 2200, and the term "E-UTRAN" or the like may refer to a RAN 2210 that operates in an LTE or 4G system 2200. The UEs 2201 utilize connections (or channels) 2203 and 2204, respectively, each of which comprises a physical communications interface or layer (discussed in further detail below).

In this example, the connections 2203 and 2204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 2201 may directly exchange communication data via a ProSe interface 2205. The ProSe interface 2205 may alternatively be referred to as a SL interface 2205 and may comprise one or more logical channels, including but not limited to a PSCCH, a PSSCH, a PSDCH, and a PSBCH.

The UE 2201*b* is shown to be configured to access an AP 2206 (also referred to as "WLAN node 2206," "WLAN 2206," "WLAN Termination 2206," "WT 2206" or the like) via connection 2207. The connection 2207 can comprise a local wireless connection, such as a connection consistent with any IEEE 802.11 protocol, wherein the AP 2206 would comprise a wireless fidelity (Wi-Fi®) router. In this example, the AP 2206 is shown to be connected to the Internet without connecting to the core network of the wireless system (described in further detail below). In various embodiments, the UE 2201*b*, RAN 2210, and AP 2206 may be configured to utilize LWA operation and/or LWIP operation. The LWA operation may involve the UE 2201*b* in RRC_CONNECTED being configured by a RAN node 2211*a-b* to utilize radio resources of LTE and WLAN. LWIP operation may involve the UE 2201*b* using WLAN radio resources (e.g., connection 2207) via IPsec protocol tunneling to authenticate and encrypt packets (e.g., IP packets) sent over the connection 2207. IPsec tunneling may include encapsulating the entirety of original IP packets and adding a new packet header, thereby protecting the original header of the IP packets.

The RAN 2210 can include one or more AN nodes or RAN nodes 2211*a* and 2211*b* (collectively referred to as "RAN nodes 2211" or "RAN node 2211") that enable the connections 2203 and 2204. As used herein, the terms "access node," "access point," or the like may describe equipment that provides the radio baseband functions for data and/or voice connectivity between a network and one or more users. These access nodes can be referred to as BS, gNBs, RAN nodes, eNB s, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 2211 that operates in an NR or 5G system 2200 (for example, a gNB), and the term "E-UTRAN node" or the like may refer to a RAN node 2211 that operates in an LTE or 4G system 2200 (e.g., an eNB). According to various embodiments, the RAN nodes 2211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 2211 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 2211; a MAC/PHY split wherein RRC, PDCP, RLC, and MAC layers are operated by the CRAN/vBBUP and the PHY layer is operated by individual RAN nodes 2211; or a "lower PHY" split wherein RRC, PDCP, RLC, MAC layers and upper portions of the PHY layer are operated by the CRAN/vBBUP and lower portions of the PHY layer are operated by individual RAN nodes 2211. This virtualized framework allows the freed-up processor cores of the RAN nodes 2211 to perform other virtualized applications. In some implementations, an individual RAN node 2211 may represent individual gNB-DUs that are connected to a gNB-CU via individual F1 interfaces (not shown by FIG. 22). In these implementations, the gNB-DUs may include one or more remote radio heads or RFEMs (see, e.g., FIG. 23), and the gNB-CU may be operated by a server that is located in the RAN 2210 (not shown) or by a server pool in a similar manner as the CRAN/vBBUP. Additionally or alternatively, one or more of the RAN nodes 2211 may be next generation eNBs (ng-eNBs), which are RAN nodes that provide E-UTRA user plane and control plane protocol terminations toward the UEs 2201, and are connected to a 5GC via an NG interface (discussed infra).

In V2X scenarios one or more of the RAN nodes 2211 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 2201 (vUEs 2201). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 2211 can terminate the air interface protocol and can be the first point of contact for the UEs 2201. In some embodiments, any of the RAN nodes 2211 can fulfill various logical functions for the RAN 2210 including, but not limited to, radio network controller (RNC) functions such as radio bearer management, uplink and downlink dynamic radio resource management and data packet scheduling, and mobility management.

In embodiments, the UEs 2201 can be configured to communicate using OFDM communication signals with each other or with any of the RAN nodes 2211 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2211 to the UEs 2201, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 2201 and the RAN nodes 2211 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 2201 and the RAN nodes 2211 may operate using LAA, eLAA, and/or feLAA mechanisms. In these implementations, the UEs 2201 and the RAN nodes 2211 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 2201 RAN nodes 2211, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 2201, AP 2206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 2201 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 2201. The PDCCH carries information about the transport format and resource allocations related to the PDSCH channel, among other things. It may also inform the UEs 2201 about the transport format, resource allocation, and HARQ information related to the uplink shared channel. Typically, downlink scheduling (assigning control and shared channel resource blocks to the UE 2201b within a cell) may be performed at any of the RAN nodes 2211 based on channel quality information fed back from any of the UEs 2201. The downlink resource assignment information may be sent on the PDCCH used for (e.g., assigned to) each of the UEs 2201.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 2211 may be configured to communicate with one another via interface 2212. In embodiments where the system 2200 is an LTE system, the interface 2212 may be an X2 interface 2212. The X2 interface may be defined between two or more RAN nodes 2211 (e.g., two or more eNBs and the like) that connect to EPC 2220, and/or between two eNBs connecting to EPC 2220. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 2201 from an SeNB for user data; information of PDCP PDUs that were not delivered to a UE 2201; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 2200 is a 5G or NR system, the interface 2212 may be an Xn interface 2212. The Xn interface is defined between two or more RAN nodes 2211 (e.g., two or more gNBs and the like) that connect to 5GC 2220, between a RAN node 2211 (e.g., a gNB) connecting to 5GC 2220 and an eNB, and/or between two eNBs connecting to 5GC 2220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 2201 in a connected mode (e.g., CM-CONNECTED) including functionality to manage the UE mobility for connected mode between one or more RAN nodes 2211. The mobility support may include context transfer from an old (source) serving RAN node 2211 to new (target) serving RAN node 2211; and control of user plane tunnels between old (source) serving RAN node 2211 to new (target) serving RAN node 2211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 2210 is shown to be communicatively coupled to a core network—in this embodiment, core network (CN) 2220. The CN 2220 may comprise a plurality of network elements 2222, which are configured to offer various data and telecommunications services to customers/subscribers (e.g., users of UEs 2201) who are connected to the CN 2220 via the RAN 2210. The components of the CN 2220 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 2220 may be referred to as a network slice, and a logical instantiation of a portion of the CN 2220 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 2230 may be an element offering applications that use IP bearer resources with the core network (e.g., UMTS PS domain, LTE PS data services, etc.). The application server 2230 can also be configured to support one or more communication services (e.g., VoIP sessions, PTT sessions, group communication sessions, social networking services, etc.) for the UEs 2201 via the EPC 2220.

In embodiments, the CN 2220 may be a 5GC (referred to as "5GC 2220" or the like), and the RAN 2210 may be connected with the CN 2220 via an NG interface 2213. In embodiments, the NG interface 2213 may be split into two parts, an NG user plane (NG-U) interface 2214, which carries traffic data between the RAN nodes 2211 and a UPF, and the S1 control plane (NG-C) interface 2215, which is a signaling interface between the RAN nodes 2211 and AMFs.

In embodiments, the CN 2220 may be a 5G CN (referred to as "5GC 2220" or the like), while in other embodiments, the CN 2220 may be an EPC). Where CN 2220 is an EPC (referred to as "EPC 2220" or the like), the RAN 2210 may be connected with the CN 2220 via an S1 interface 2213. In embodiments, the S1 interface 2213 may be split into two parts, an S1 user plane (S1-U) interface 2214, which carries traffic data between the RAN nodes 2211 and the S-GW, and the S1-MME interface 2215, which is a signaling interface between the RAN nodes 2211 and MMEs.

Figure 23:
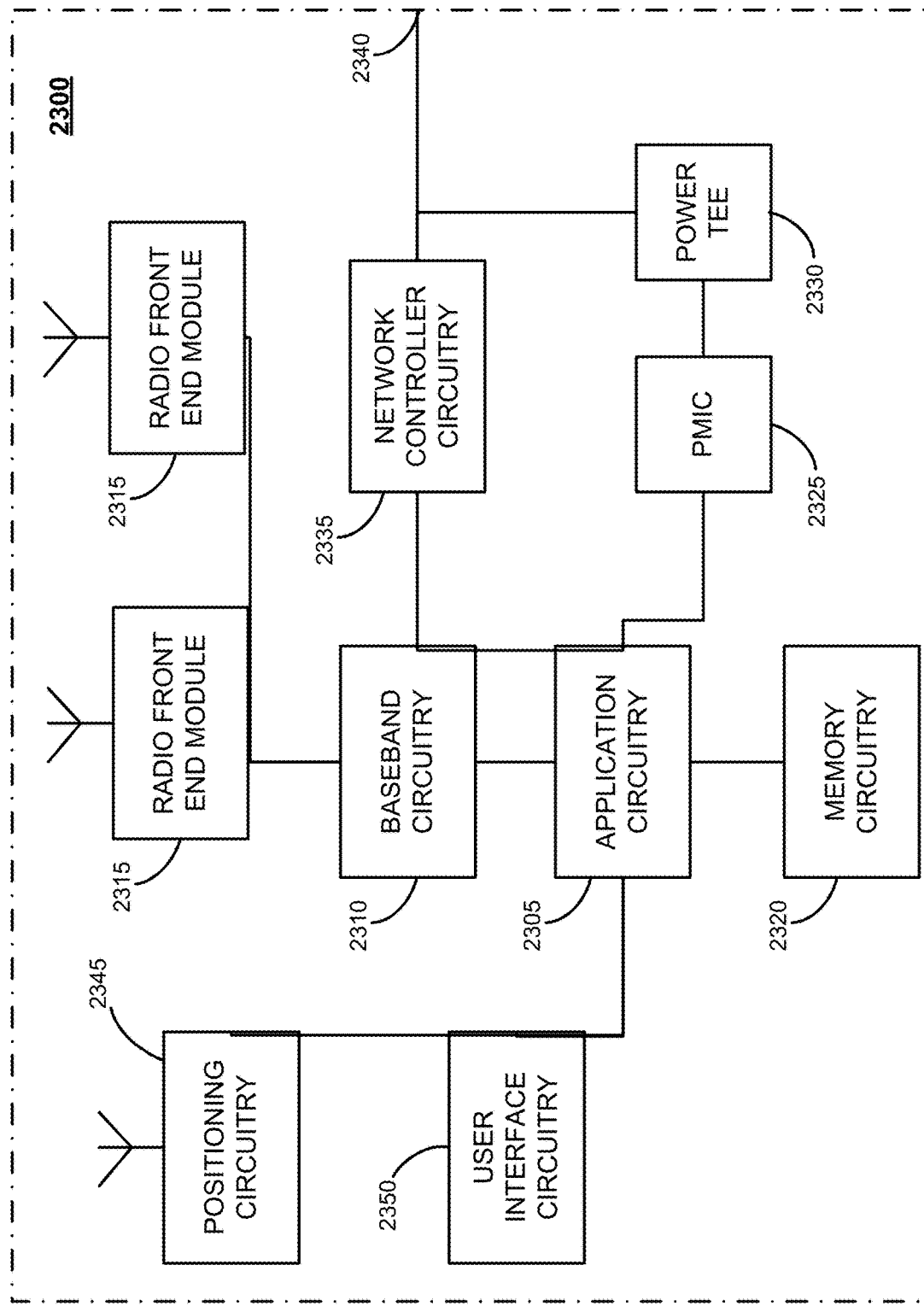
FIG. 23 illustrates an example of infrastructure equipment in accordance with various embodiments.

FIG. 23 illustrates an example of infrastructure equipment 2300 in accordance with various embodiments. The infrastructure equipment 2300 (or "system 2300") may be implemented as a base station, radio head, RAN node such as the RAN nodes 2211 and/or AP 2206 shown and described previously, application server(s) 2230, and/or any other element/device discussed herein. In other examples, the system 2300 could be implemented in or by a UE.

The system 2300 includes application circuitry 2305, baseband circuitry 2310, one or more radio front end modules (RFEMs) 2315, memory circuitry 2320, power management integrated circuitry (PMIC) 2325, power tee circuitry 2330, network controller circuitry 2335, network interface connector 2340, satellite positioning circuitry 2345, and user interface 2350. In some embodiments, the device 2300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 2305 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2305 may be coupled with or may include memory/storage elements and may be configured to execute instructions stored in the memory/storage to enable various applications or operating systems to run on the system 2300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 2305 may comprise, or may be, a special-purpose processor/controller to operate according to the various embodiments herein. As examples, the processor(s) of application circuitry 2305 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2300 may not utilize application circuitry 2305, and instead may include a special-purpose processor/controller to process IP data received from an EPC or 5GC, for example.

In some implementations, the application circuitry 2305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 2305 may comprise logic blocks or logic fabric, and other interconnected resources that may be programmed to perform various functions, such as the procedures, methods, functions, etc. of the various embodiments discussed herein. In such embodiments, the circuitry of application circuitry 2305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 2310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2310 are discussed infra with regard to FIG. 25.

User interface circuitry 2350 may include one or more user interfaces designed to enable user interaction with the system 2300 or peripheral component interfaces designed to enable peripheral component interaction with the system 2300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 2511 of FIG. 25 infra), and the RFEM may be connected to multiple antennas. In alternative implementations, both mmWave and sub-mmWave radio functions may be implemented in the same physical RFEM 2315, which incorporates both mmWave antennas and sub-mmWave.

The memory circuitry 2320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2320 may be implemented as one or more of solder down packaged integrated circuits, socketed memory modules and plug-in memory cards.

The PMIC 2325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2330 may provide for electrical power drawn from a network cable to provide both power supply and data connectivity to the infrastructure equipment 2300 using a single cable.

The network controller circuitry 2335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 2300 via network interface connector 2340 using a physical connection, which may be electrical (commonly referred to as a "copper interconnect"), optical, or wireless. The network controller circuitry 2335 may include one or more dedicated processors and/or FPGAs to communicate using one or more of the aforementioned protocols. In some implementations, the network controller circuitry 2335 may include multiple controllers to provide connectivity to other networks using the same or different protocols.

The positioning circuitry 2345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2345 may include a Micro-Technology for Positioning, Navigation, and Timing (Micro-PNT) IC that uses a master timing clock to perform position tracking/estimation without GNSS assistance. The positioning circuitry 2345 may also be part of, or interact with, the baseband circuitry 2310 and/or RFEMs 2315 to communicate with the nodes and components of the positioning network. The positioning circuitry 2345 may also provide position data and/or time data to the application circuitry 2305, which may use the data to synchronize operations with various infrastructure (e.g., RAN nodes 2211, etc.), or the like.

The components shown by FIG. 23 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 24:
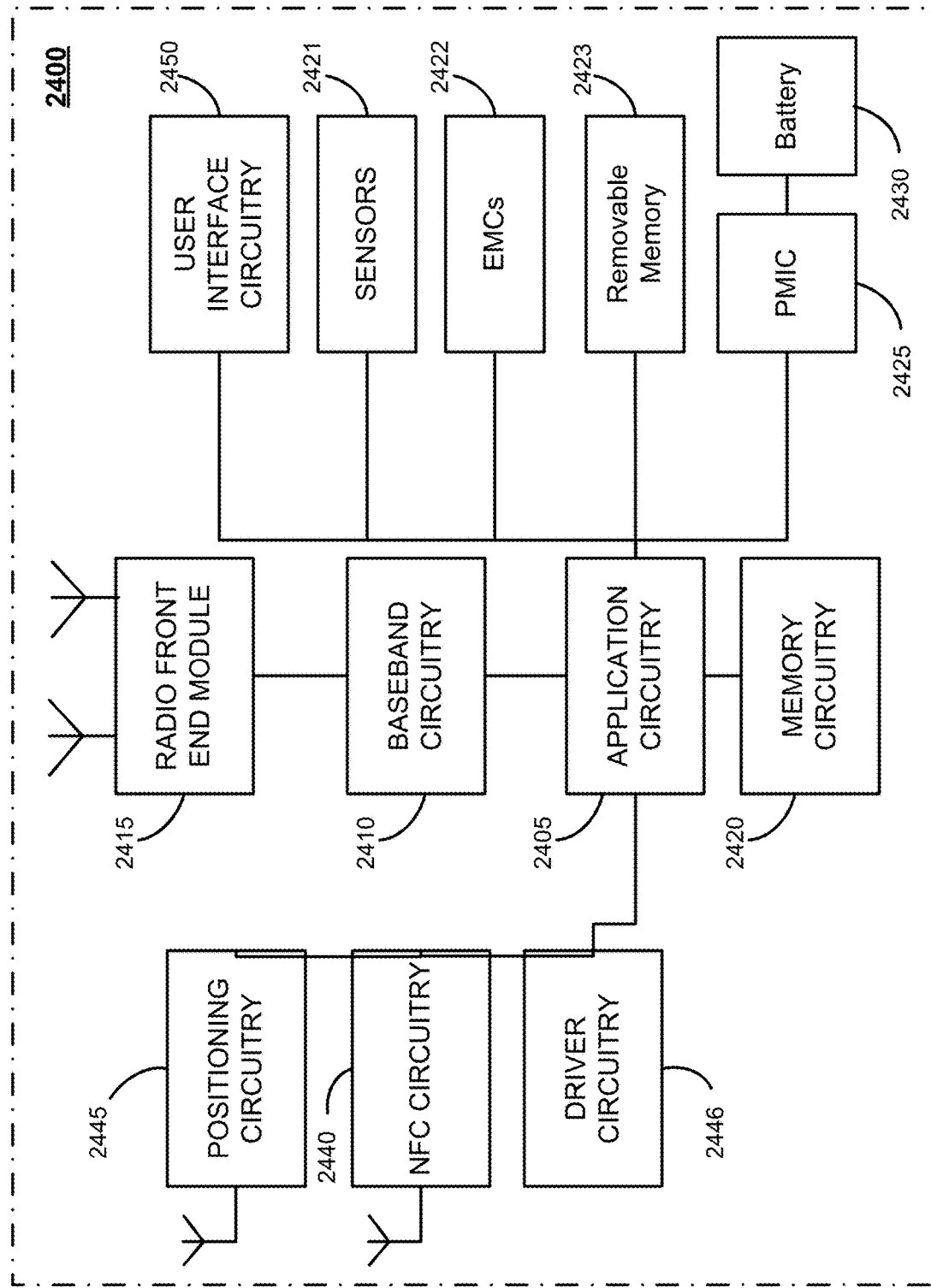
FIG. 24 illustrates an example of a computer platform in accordance with various embodiments.

FIG. 24 illustrates an example of a platform 2400 (or "device 2400") in accordance with various embodiments. In embodiments, the computer platform 2400 may be suitable for use as UEs 2201, application servers 2230, and/or any other element/device discussed herein. The platform 2400 may include any combinations of the components shown in the example. The components of platform 2400 may be implemented as integrated circuits (ICs), portions thereof, discrete electronic devices, or other modules, logic, hardware, software, firmware, or a combination thereof adapted in the computer platform 2400, or as components otherwise incorporated within a chassis of a larger system. The block diagram of FIG. 24 is intended to show a high level view of components of the computer platform 2400. However, some of the components shown may be omitted, additional components may be present, and different arrangement of the components shown may occur in other implementations.

Application circuitry 2405 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 2405 may be coupled with or may include memory/storage elements and may be configured to execute instructions stored in the memory/storage to enable various applications or operating systems to run on the system 2400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2305 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 2305 may comprise, or may be, a special-purpose processor/controller to operate according to the various embodiments herein.

As examples, the processor(s) of application circuitry 2405 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 2405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 2405 may be a part of a system on a chip (SoC) in which the application circuitry 2405 and other components are formed into a single integrated circuit, or a single package, such as the Edison™ or Galileo™ SoC boards from Intel® Corporation.

Additionally or alternatively, application circuitry 2405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 2405 may comprise logic blocks or logic fabric, and other interconnected resources that may be programmed to perform various functions, such as the procedures, methods, functions, etc. of the various embodiments discussed herein. In such embodiments, the circuitry of application circuitry 2405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 2410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2410 are discussed infra with regard to FIG. 25.

The RFEMs 2415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 2511 of FIG. 25 infra), and the RFEM may be connected to multiple antennas. In alternative implementations, both mmWave and sub-mmWave radio functions may be implemented in the same physical RFEM 2415, which incorporates both mmWave antennas and sub-mmWave.

The memory circuitry 2420 may include any number and type of memory devices used to provide for a given amount of system memory. As examples, the memory circuitry 2420 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 2420 may be developed in accordance with a Joint Electron Devices Engineering Council (JEDEC) low power double data rate (LPDDR)-based design, such as LPDDR2, LPDDR3, LPDDR4, or the like. Memory circuitry 2420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 2420 may be on-die memory or registers associated with the application circuitry 2405. To provide for persistent storage of information such as data, applications, operating systems and so forth, memory circuitry 2420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 2400 may incorporate the three-dimensional (3D) cross-point (XPOINT) memories from Intel® and Micron®.

Removable memory circuitry 2423 may include devices, circuitry, enclosures/housings, ports or receptacles, etc. used to couple portable data storage devices with the platform 2400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 2400 may also include interface circuitry (not shown) that is used to connect external devices with the platform 2400. The external devices connected to the platform 2400 via the interface circuitry include sensor circuitry 2421 and electro-mechanical components (EMCs) 2422, as well as removable memory devices coupled to removable memory circuitry 2423.

The sensor circuitry 2421 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 2422 include devices, modules, or subsystems whose purpose is to enable platform 2400 to change its state, position, and/or orientation, or move or control a mechanism or (sub)system. Additionally, EMCs 2422 may be configured to generate and send messages/signalling to other components of the platform 2400 to indicate a current state of the EMCs 2422. Examples of the EMCs 2422 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 2400 is configured to operate one or more EMCs 2422 based on one or more captured events and/or instructions or control signals received from a service provider and/or various clients.

In some implementations, the interface circuitry may connect the platform 2400 with positioning circuitry 2445. The positioning circuitry 2445 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 2445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2445 may include a Micro-PNT IC that uses a master timing clock to perform position tracking/estimation without GNSS assistance. The positioning circuitry 2445 may also be part of, or interact with, the baseband circuitry 2310 and/or RFEMs 2415 to communicate with the nodes and components of the positioning network. The positioning circuitry 2445 may also provide position data and/or time data to the application circuitry 2405, which may use the data to synchronize operations with various infrastructure (e.g., radio base stations), for turn-by-turn navigation applications, or the like In some implementations, the interface circuitry may connect the platform 2400 with Near-Field Communication (NFC) circuitry 2440. NFC circuitry 2440 is configured to provide contactless, short-range communications based on radio frequency identification (RFID) standards, wherein magnetic field induction is used to enable communication between NFC circuitry 2440 and NFC-enabled devices external to the platform 2400 (e.g., an "NFC touchpoint"). NFC circuitry 2440 comprises an NFC controller coupled with an antenna element and a processor coupled with the NFC controller. The NFC controller may be a chip/IC providing NFC functionalities to the NFC circuitry 2440 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 2440, or initiate data transfer between the NFC circuitry 2440 and another active NFC device (e.g., a smartphone or an NFC-enabled POS terminal) that is proximate to the platform 2400.

The driver circuitry 2446 may include software and hardware elements that operate to control particular devices that are embedded in the platform 2400, attached to the platform 2400, or otherwise communicatively coupled with the platform 2400. The driver circuitry 2446 may include individual drivers allowing other components of the platform 2400 to interact with or control various input/output (I/O) devices that may be present within, or connected to, the platform 2400. For example, driver circuitry 2446 may include a display driver to control and allow access to a display device, a touchscreen driver to control and allow access to a touchscreen interface of the platform 2400, sensor drivers to obtain sensor readings of sensor circuitry 2421 and control and allow access to sensor circuitry 2421, EMC drivers to obtain actuator positions of the EMCs 2422 and/or control and allow access to the EMCs 2422, a camera driver to control and allow access to an embedded image capture device, audio drivers to control and allow access to one or more audio devices.

The power management integrated circuitry (PMIC) 2425 (also referred to as "power management circuitry 2425") may manage power provided to various components of the platform 2400. In particular, with respect to the baseband circuitry 2410, the PMIC 2425 may control power-source selection, voltage scaling, battery charging, or DC-to-DC conversion. The PMIC 2425 may often be included when the platform 2400 is capable of being powered by a battery 2430, for example, when the device is included in a UE 2201.

In some embodiments, the PMIC 2425 may control, or otherwise be part of, various power saving mechanisms of the platform 2400. For example, if the platform 2400 is in an RRC_Connected state, where it is still connected to the RAN node as it expects to receive traffic shortly, then it may enter a state known as Discontinuous Reception Mode (DRX) after a period of inactivity. During this state, the platform 2400 may power down for brief intervals of time and thus save power. If there is no data traffic activity for an extended period of time, then the platform 2400 may transition off to an RRC_Idle state, where it disconnects from the network and does not perform operations such as channel quality feedback, handover, etc. The platform 2400 goes into a very low power state and it performs paging where again it periodically wakes up to listen to the network and then powers down again. The platform 2400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2430 may power the platform 2400, although in some examples the platform 2400 may be mounted deployed in a fixed location, and may have a power supply coupled to an electrical grid. The battery 2430 may be a lithium ion battery, a metal-air battery, such as a zinc-air battery, an aluminum-air battery, a lithium-air battery, and the like. In some implementations, such as in V2X applications, the battery 2430 may be a typical lead-acid automotive battery.

In some implementations, the battery 2430 may be a "smart battery," which includes or is coupled with a Battery Management System (BMS) or battery monitoring integrated circuitry. The BMS may be included in the platform 2400 to track the state of charge (SoCh) of the battery 2430. The BMS may be used to monitor other parameters of the battery 2430 to provide failure predictions, such as the state of health (SoH) and the state of function (SoF) of the battery 2430. The BMS may communicate the information of the battery 2430 to the application circuitry 2405 or other components of the platform 2400. The BMS may also include an analog-to-digital (ADC) convertor that allows the application circuitry 2405 to directly monitor the voltage of the battery 2430 or the current flow from the battery 2430. The battery parameters may be used to determine actions that the platform 2400 may perform, such as transmission frequency, network operation, sensing frequency, and the like.

A power block, or other power supply coupled to an electrical grid may be coupled with the BMS to charge the battery 2430. In some examples, the power block may be replaced with a wireless power receiver to obtain the power wirelessly, for example, through a loop antenna in the computer platform 2400. In these examples, a wireless battery charging circuit may be included in the BMS. The specific charging circuits chosen may depend on the size of the battery 2430, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 2450 includes various input/output (I/O) devices present within, or connected to, the platform 2400, and includes one or more user interfaces designed to enable user interaction with the platform 2400 and/or peripheral component interfaces designed to enable peripheral component interaction with the platform 2400. The user interface circuitry 2450 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 2400. The output device circuitry may also include speakers or other audio emitting devices, printer(s), and/or the like. In some embodiments, the sensor circuitry 2421 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 2400 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 25:
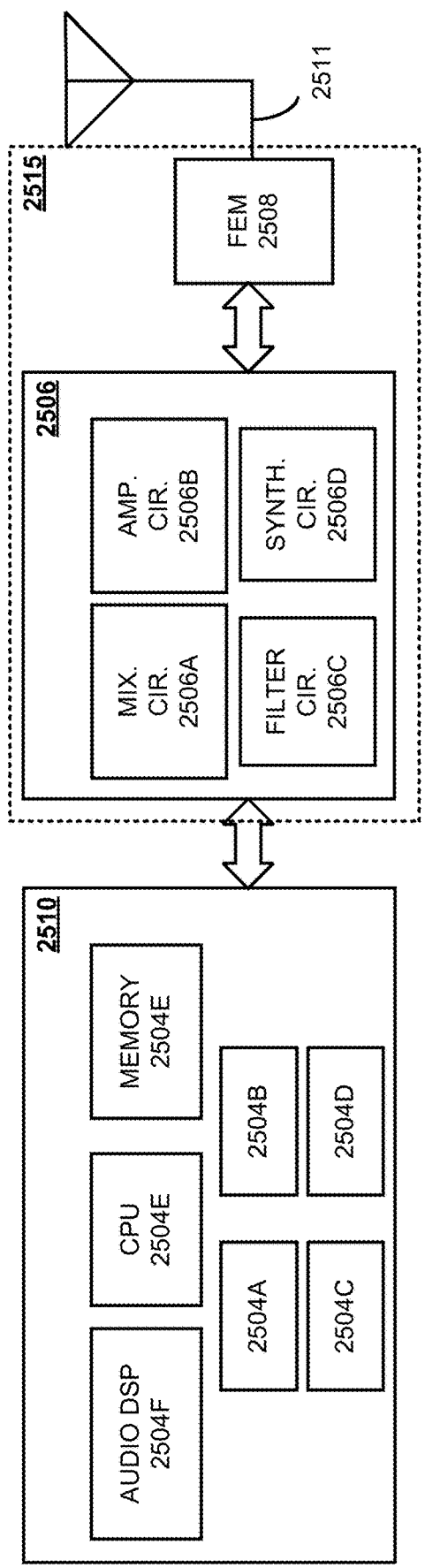
FIG. 25 illustrates example components of baseband circuitry and radio front end modules in accordance with various embodiments.

FIG. 25 illustrates example components of baseband circuitry 2510 and radio front end modules (RFEM) 2515 in accordance with various embodiments. The baseband circuitry 2510 corresponds to the baseband circuitry 2310 and 2410 of FIGS. 23 and 24, respectively. The RFEM 2515 corresponds to the RFEM 2315 and 2415 of FIGS. 23 and 24, respectively. As shown, the RFEMs 2515 may include Radio Frequency (RF) circuitry 2506, front-end module (FEM) circuitry 2508, antenna array 2511 coupled together at least as shown.

The baseband circuitry 2510 includes circuitry and/or control logic configured to carry out various radio/network protocol and radio control functions that enable communication with one or more radio networks via the RF circuitry 2506. The radio control functions may include, but are not limited to, signal modulation/demodulation, encoding/decoding, radio frequency shifting, etc. In some embodiments, modulation/demodulation circuitry of the baseband circuitry 2510 may include Fast-Fourier Transform (FFT), precoding, or constellation mapping/demapping functionality. In some embodiments, encoding/decoding circuitry of the baseband circuitry 2510 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 2510 is configured to process baseband signals received from a receive signal path of the RF circuitry 2506 and to generate baseband signals for a transmit signal path of the RF circuitry 2506. The baseband circuitry 2510 is configured to interface with application circuitry 2305/2405 (see FIGS. 23 and 24) for generation and processing of the baseband signals and for controlling operations of the RF circuitry 2506. The baseband circuitry 2510 may handle various radio control functions.

The aforementioned circuitry and/or control logic of the baseband circuitry 2510 may include one or more single or multi-core processors. For example, the one or more processors may include a 3G baseband processor 2504A, a 4G/LTE baseband processor 2504B, a 5G/NR baseband processor 2504C, or some other baseband processor(s) 2504D for other existing generations, generations in development or to be developed in the future (e.g., sixth generation (6G), etc.). In other embodiments, some or all of the functionality of baseband processors 2504A-D may be included in modules stored in the memory 2504G and executed via a Central Processing Unit (CPU) 2504E. In other embodiments, some or all of the functionality of baseband processors 2504A-D may be provided as hardware accelerators (e.g., FPGAs, ASICs, etc.) loaded with the appropriate bit streams or logic blocks stored in respective memory cells. In various embodiments, the memory 2504G may store program code of a real-time OS (RTOS), which when executed by the CPU 2504E (or other baseband processor), is to cause the CPU 2504E (or other baseband processor) to manage resources of the baseband circuitry 2510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 2510 includes one or more audio digital signal processor(s) (DSP) 2504F. The audio DSP(s) 2504F include elements for compression/decompression and echo cancellation and may include other suitable processing elements in other embodiments.

In some embodiments, each of the processors 2504A-2504E include respective memory interfaces to send/receive data to/from the memory 2504G. The baseband circuitry 2510 may further include one or more interfaces to communicatively couple to other circuitries/devices, such as an interface to send/receive data to/from memory external to the baseband circuitry 2510; an application circuitry interface to send/receive data to/from the application circuitry 2305/2405 of FIGS. 23-25); an RF circuitry interface to send/receive data to/from RF circuitry 2506 of FIG. 25; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 2425.

In alternate embodiments (which may be combined with the above described embodiments), baseband circuitry 2510 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 2510 may include protocol processing circuitry with one or more instances of control circuitry (not shown) to provide control functions for the digital baseband circuitry and/or radio frequency circuitry (e.g., the radio front end modules 2515).

Although not shown by FIG. 25, in some embodiments, the baseband circuitry 2510 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 2510 and/or RF circuitry 2506 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 2510 and/or RF circuitry 2506 are part of a Wi-Fi communication system. In the second example, the protocol processing circuitry would operate Wi-Fi MAC and logical link control (LLC) functions. The protocol processing circuitry may include one or more memory structures (e.g., 2504G) to store program code and data for operating the protocol functions, as well as one or more processing cores to execute the program code and perform various operations using the data. The baseband circuitry 2510 may also support radio communications for more than one wireless protocol.

The various hardware elements of the baseband circuitry 2510 discussed herein may be implemented, for example, as a solder-down substrate including one or more integrated circuits (ICs), a single packaged IC soldered to a main circuit board or a multi-chip module containing two or more ICs. In one example, the components of the baseband circuitry 2510 may be suitably combined in a single chip or chipset, or disposed on a same circuit board. In another example, some or all of the constituent components of the baseband circuitry 2510 and RF circuitry 2506 may be implemented together such as, for example, a system on a chip (SoC) or System-in-Package (SiP). In another example, some or all of the constituent components of the baseband circuitry 2510 may be implemented as a separate SoC that is communicatively coupled with and RF circuitry 2506 (or multiple instances of RF circuitry 2506). In yet another example, some or all of the constituent components of the baseband circuitry 2510 and the application circuitry 2305/2405 may be implemented together as individual SoCs mounted to a same circuit board (e.g., a "multi-chip package").

In some embodiments, the baseband circuitry 2510 may provide for communication compatible with one or more radio technologies. For example, in some embodiments, the baseband circuitry 2510 may support communication with an E-UTRAN or other WMAN, a WLAN, a WPAN. Embodiments in which the baseband circuitry 2510 is configured to support radio communications of more than one wireless protocol may be referred to as multi-mode baseband circuitry.

RF circuitry 2506 may enable communication with wireless networks using modulated electromagnetic radiation through a non-solid medium. In various embodiments, the RF circuitry 2506 may include switches, filters, amplifiers, etc. to facilitate the communication with the wireless network. RF circuitry 2506 may include a receive signal path, which may include circuitry to down-convert RF signals received from the FEM circuitry 2508 and provide baseband signals to the baseband circuitry 2510. RF circuitry 2506 may also include a transmit signal path, which may include circuitry to up-convert baseband signals provided by the baseband circuitry 2510 and provide RF output signals to the FEM circuitry 2508 for transmission.

In some embodiments, the receive signal path of the RF circuitry 2506 may include mixer circuitry 2506a, amplifier circuitry 2506b and filter circuitry 2506c. In some embodiments, the transmit signal path of the RF circuitry 2506 may include filter circuitry 2506c and mixer circuitry 2506a. RF circuitry 2506 may also include synthesizer circuitry 2506d for synthesizing a frequency for use by the mixer circuitry 2506a of the receive signal path and the transmit signal path. In some embodiments, the mixer circuitry 2506a of the receive signal path may be configured to down-convert RF signals received from the FEM circuitry 2508 based on the synthesized frequency provided by synthesizer circuitry 2506d. The amplifier circuitry 2506b may be configured to amplify the down-converted signals and the filter circuitry 2506c may be a low-pass filter (LPF) or band-pass filter (BPF) configured to remove unwanted signals from the down-converted signals to generate output baseband signals. Output baseband signals may be provided to the baseband circuitry 2510 for further processing. In some embodiments, the output baseband signals may be zero-frequency baseband signals, although this is not a requirement. In some embodiments, mixer circuitry 2506a of the receive signal path may comprise passive mixers, although the scope of the embodiments is not limited in this respect.

In some embodiments, the mixer circuitry 2506a of the transmit signal path may be configured to up-convert input baseband signals based on the synthesized frequency provided by the synthesizer circuitry 2506d to generate RF output signals for the FEM circuitry 2508. The baseband signals may be provided by the baseband circuitry 2510 and may be filtered by filter circuitry 2506c.

In some embodiments, the mixer circuitry 2506a of the receive signal path and the mixer circuitry 2506a of the transmit signal path may include two or more mixers and may be arranged for quadrature downconversion and upconversion, respectively. In some embodiments, the mixer circuitry 2506a of the receive signal path and the mixer circuitry 2506a of the transmit signal path may include two or more mixers and may be arranged for image rejection (e.g., Hartley image rejection). In some embodiments, the mixer circuitry 2506a of the receive signal path and the mixer circuitry 2506a of the transmit signal path may be arranged for direct downconversion and direct upconversion, respectively. In some embodiments, the mixer circuitry 2506a of the receive signal path and the mixer circuitry 2506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2506 may include analog-to-digital converter (ADC) and digital-to-analog converter (DAC) circuitry and the baseband circuitry 2510 may include a digital baseband interface to communicate with the RF circuitry 2506.

In some dual-mode embodiments, a separate radio IC circuitry may be provided for processing signals for each spectrum, although the scope of the embodiments is not limited in this respect.

In some embodiments, the synthesizer circuitry 2506d may be a fractional-N synthesizer or a fractional N/N+1 synthesizer, although the scope of the embodiments is not limited in this respect as other types of frequency synthesizers may be suitable. For example, synthesizer circuitry 2506d may be a delta-sigma synthesizer, a frequency multiplier, or a synthesizer comprising a phase-locked loop with a frequency divider.

The synthesizer circuitry 2506d may be configured to synthesize an output frequency for use by the mixer circuitry 2506a of the RF circuitry 2506 based on a frequency input and a divider control input. In some embodiments, the synthesizer circuitry 2506d may be a fractional N/N+1 synthesizer.

In some embodiments, frequency input may be provided by a voltage controlled oscillator (VCO), although that is not a requirement. Divider control input may be provided by either the baseband circuitry 2510 or the application circuitry 2305/2405 depending on the desired output frequency. In some embodiments, a divider control input (e.g., N) may be determined from a look-up table based on a channel indicated by the application circuitry 2305/2405.

Synthesizer circuitry 2506d of the RF circuitry 2506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2506 may include an IQ/polar converter.

FEM circuitry 2508 may include a receive signal path, which may include circuitry configured to operate on RF signals received from antenna array 2511, amplify the received signals and provide the amplified versions of the received signals to the RF circuitry 2506 for further processing. FEM circuitry 2508 may also include a transmit signal path, which may include circuitry configured to amplify signals for transmission provided by the RF circuitry 2506 for transmission by one or more of antenna elements of antenna array 2511. In various embodiments, the amplification through the transmit or receive signal paths may be done solely in the RF circuitry 2506, solely in the FEM circuitry 2508, or in both the RF circuitry 2506 and the FEM circuitry 2508.

In some embodiments, the FEM circuitry 2508 may include a TX/RX switch to switch between transmit mode and receive mode operation. The FEM circuitry 2508 may include a receive signal path and a transmit signal path. The receive signal path of the FEM circuitry 2508 may include an LNA to amplify received RF signals and provide the amplified received RF signals as an output (e.g., to the RF circuitry 2506). The transmit signal path of the FEM circuitry 2508 may include a power amplifier (PA) to amplify input RF signals (e.g., provided by RF circuitry 2506), and one or more filters to generate RF signals for subsequent transmission by one or more antenna elements of the antenna array 2511.

The antenna array 2511 comprises one or more antenna elements, each of which is configured convert electrical signals into radio waves to travel through the air and to convert received radio waves into electrical signals. For example, digital baseband signals provided by the baseband circuitry 2510 is converted into analog RF signals (e.g., modulated waveform) that will be amplified and transmitted via the antenna elements of the antenna array 2511 including one or more antenna elements (not shown). The antenna elements may be omnidirectional, direction, or a combination thereof. The antenna elements may be formed in a multitude of arranges as are known and/or discussed herein. The antenna array 2511 may comprise microstrip antennas or printed antennas that are fabricated on the surface of one or more printed circuit boards. The antenna array 2511 may be formed in as a patch of metal foil (e.g., a patch antenna) in a variety of shapes, and may be coupled with the RF circuitry 2506 and/or FEM circuitry 2508 using metal transmission lines or the like.

Processors of the application circuitry 2305/2405 and processors of the baseband circuitry 2510 may be used to execute elements of one or more instances of a protocol stack. For example, processors of the baseband circuitry 2510, alone or in combination, may be used execute Layer 3, Layer 2, or Layer 1 functionality, while processors of the application circuitry 2305/2405 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 26:
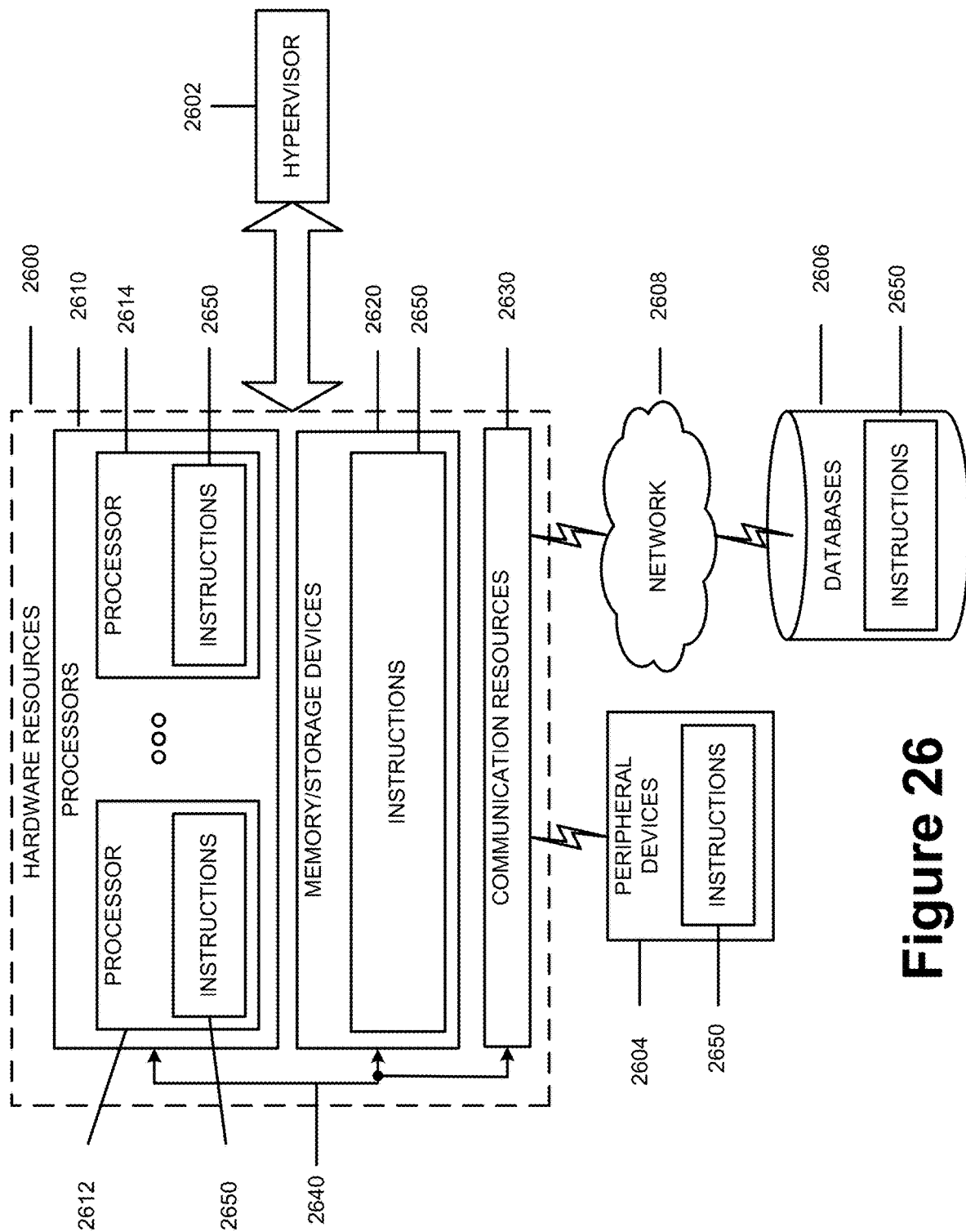
FIG. 26 is a block diagram illustrating components, according to some example embodiments, able to read instructions from a machine-readable or computer-readable medium (e.g., a non-transitory machine-readable storage medium) and perform any one or more of the methodologies discussed herein.

FIG. 26 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 26 shows a diagrammatic representation of hardware resources 2600 including one or more processors (or processor cores) 2610, one or more memory/storage devices 2620, and one or more communication resources 2630, each of which may be communicatively coupled via a bus 2640. For embodiments where node virtualization (e.g., NFV) is utilized, a hypervisor 2602 may be executed to provide an execution environment for one or more network slices/sub-slices to utilize the hardware resources 2600.

The processors 2610 may include, for example, a processor 2612 and a processor 2614. The processor(s) 2610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2620 may include main memory, disk storage, or any suitable combination thereof. The memory/storage devices 2620 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2630 may include interconnection or network interface components or other suitable devices to communicate with one or more peripheral devices 2604 or one or more databases 2606 via a network 2608. For example, the communication resources 2630 may include wired communication components (e.g., for coupling via USB), cellular communication components, NFC components, Bluetooth® (or Bluetooth® Low Energy) components, Wi-Fi® components, and other communication components.

Instructions 2650 may comprise software, a program, an application, an applet, an app, or other executable code for causing at least any of the processors 2610 to perform any one or more of the methodologies discussed herein. The instructions 2650 may reside, completely or partially, within at least one of the processors 2610 (e.g., within the processor's cache memory), the memory/storage devices 2620, or any suitable combination thereof. Furthermore, any portion of the instructions 2650 may be transferred to the hardware resources 2600 from any combination of the peripheral devices 2604 or the databases 2606. Accordingly, the memory of processors 2610, the memory/storage devices 2620, the peripheral devices 2604, and the databases 2606 are examples of computer-readable and machine-readable media.

Example Procedures

Figure 27:
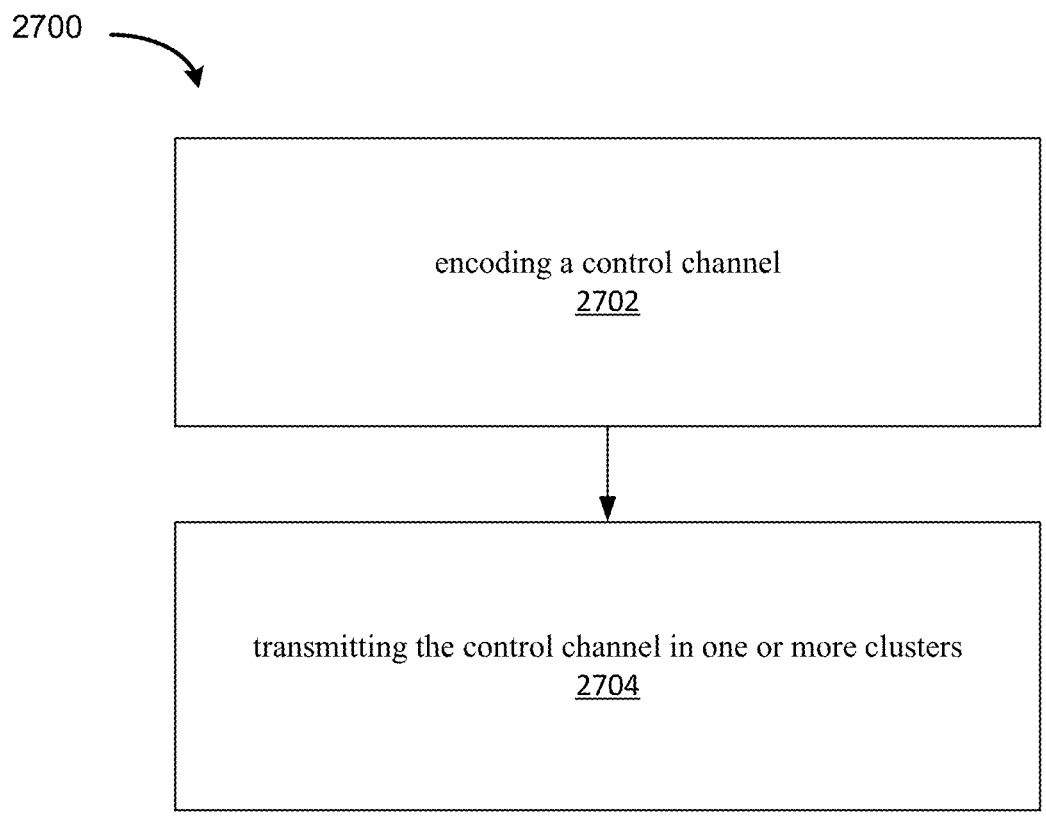
FIG. 27 is a flowchart to illustrate a process in accordance with various embodiments.

In some embodiments, the electronic device(s), network (s), system(s), chip(s) or component(s), or portions or implementations thereof, of FIG. 22-26, or some other figure herein, may be configured to perform one or more processes, techniques, or methods as described herein, or portions thereof. One such process 2700 is depicted in FIG. 27. For example, the process 2700 may include, at 2702, encoding a control channel. In some embodiments, the control channel may be encoded by generating a CORESET that includes a plurality of clusters, with each cluster including a control portion and a DMRS portion. In some embodiments, the control/DMRS portions may be TDM'd. In other embodiments, the DMRS portion may be CDM'd or FDM'd while the control portion is TDM'd.

Figure 4:
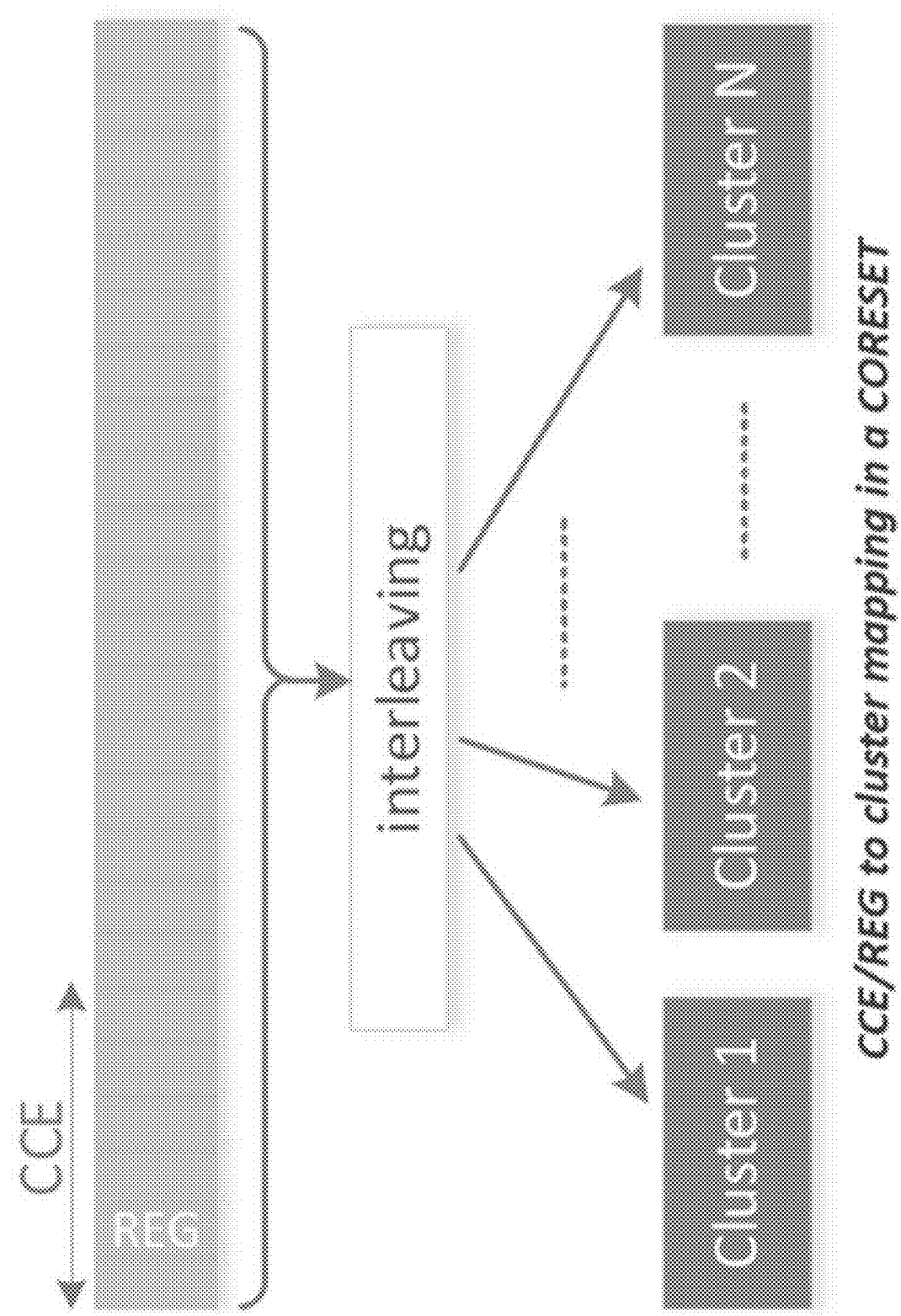
FIG. 4 illustrates control channel element (CCE) and/or resource element group (REG) to cluster mapping in a CORESET, in accordance with various embodiments.

In some embodiments, the encoding may include CCE/REG to cluster mapping as described above with respect to FIG. 4.

In some embodiments, the encoding may include DFT transformation for group of PDCCH candidates as described above with respect to FIG. 5.

In some embodiments, the encoding may include using different DFT transform sizes for DM RS and control as described above with respect to FIG. 6.

In some embodiments, the encoding may include using the same bandwidth for each PDCCH candidates in associated DMRS as described above with respect to FIG. 7.

In some embodiments, the encoding may include using the same bandwidth for transmission of all potential PDCCH candidates and DMRS as described above with respect to FIG. 8.

In some embodiments, the encoding may include using different bandwidth for transmission of each PDCCH candidates and DMRS as described above with respect to FIG. 9.

For example, the process 2700 may further include, at 2704, transmitting the control channel including, for example, PDCCH and DMRS in one or more clusters.

In some embodiments, the process 2700 may be performed by a gNB or a portion thereof.

A UE may receive the control channel (e.g., by monitoring for the control channel in one or more PDCCH candidates). Accordingly, the UE may perform a corresponding process on the receive side.

Figure 28:
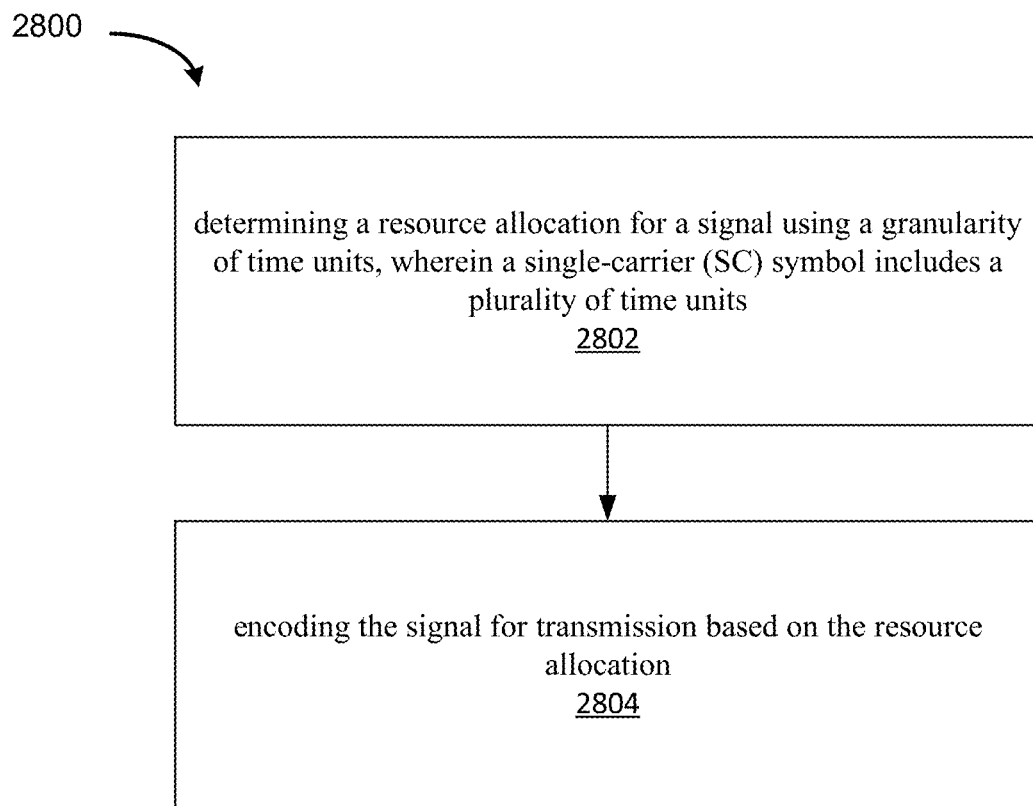
FIG. 28 is a flowchart to illustrate another process in accordance with various embodiments.

FIG. 28 illustrates another process 2800 in accordance with various embodiments. The process 2800 may include, at 2802, determining a resource allocation for a signal using a granularity of time units, wherein a single-carrier (SC) symbol includes a plurality of time units. At 2804, the process 2800 may include encoding the signal for transmission based on the resource allocation.

In some embodiments, the process 2800 may further include mapping the time units to respective modulation symbols in the SC symbol. For example, the mapping may include applying an interleaving operation to the time units.

In some such embodiments, the interleaving may be applied to a group of time units that correspond to multiple consecutive SC symbols.

In some embodiments, the process 2800 may be performed by a gNB and/or a UE, or portions thereof. Additionally, the device (e.g., UE or gNB) that receives the signal may perform a corresponding process to receive the signal.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method for wireless communication for a fifth generation (5G) or new radio (NR) system, the method comprising: encoding a control channel; and transmitting the control channel.

Example 2 may include the method of example 1 or some other example herein, further comprising transmitting the control channel on a control resource set (CORESET) that includes X clusters of time/frequency resources, $X \geq 1$.

Example 3 may include the method of example 2 or some other example herein, further comprising: using different precoders for the X clusters.

Example 4 may include the method of example 2 or some other example herein, further comprising: individually configuring the X clusters of the CORESET by higher-layer signaling (for example, higher than the physical layer).

Example 5 may include the method of example 2 or some other example herein, wherein M sets of frequency resources and N sets of time resources are configured for a CORESET, which forms X=M N clusters.

Example 6 may include the method of example 2 or some other example herein, further comprising: time-division multiplexing DMRS and control for individual clusters of the X clusters.

Example 7 may include the method of example 2 or some other example herein, wherein the DMRS of multiple clusters using same sets of frequency resources is transmitted in the beginning of the CORESET.

Example 8 may include the method of example 2 or some other example herein, further comprising: mapping a control channel element (CCE) to resource element groups (REGs) located in multiple clusters.

Example 9 may include the method of example 2 or some other example herein, wherein a CCE is defined within a cluster and a PDCCH candidate with AL>1 is mapped to the CCEs located in multiple clusters.

Example 10 may include the method of example 2 or some other example herein, wherein the control channel is a PDCCH and the method further comprises: determining a DFT size of the PDCCH separately from a DFT size of data transmission.

Example 11 may include the method of example 10 or some other example herein, further comprising: performing a separate DFT per CCE.

Example 12 may include the method of claim 10, further comprising: performing a separate DFT for a group of D consecutive CCEs, wherein D is an integer.

Example 13 may include the method of example 12 or some other example herein, wherein a DFT size for an associated DMRS is different from a DFT size of D consecutive CCEs.

Example 14 may include the method of example 1 or some other example herein, further comprising: allocating a same bandwidth for the transmission of each PDCCH candidate and its associated DMRS.

Example 15 may include the method of example 1 or some other example herein, further comprising: allocating a same bandwidth for transmission of all potential PDCCH candidates and DMRS.

Example 16 may include the method of example 1 or some other example herein, further comprising: allocating different bandwidth for transmission of each PDCCH candidate and DMRS.

Example 17 may include the method of example 1 or some other example herein, further comprising: configuring a plurality of clusters of time/frequency resources for a CORESET; and applying DFT processing separately to individual clusters of the plurality of clusters.

Example 18 may include the method of example 17 or some other example herein, further comprising: using different precoders for different clusters of the plurality of clusters.

Example 19 may include the method of example 17 or some other example herein, wherein encoding the control channel comprises encoding individual clusters with control information and corresponding DMRS to be used as a phase reference for demodulation of the control information.

Example 20 may include the method of example 19 or some other example herein, wherein encoding the control channel further comprises time division multiplexing the control information and the corresponding DMRS.

Example 21 may include the method of example 20 or some other example herein, wherein the control information includes one or two symbols per cluster.

Example 22 may include the method of example 19 or some other example herein, wherein encoding the control channel further comprises: multiplexing (by FDM, CDM, or TDM) a plurality of DMRSs in a first symbol of a CORESET; and time-division multiplexing a plurality of control information, which respectively corresponds to the plurality of DMRSs, after the first symbol of the CORESET.

Example 23 may include the method of example 1 or some other example herein, further comprising: mapping a control channel element to resource element groups located in a plurality of clusters.

Example 24 may include the method of example 23 or some other example herein, further comprising concatenating modulation symbols of a plurality of CCEs by CCE indices; and interleaving the resource element groups into the plurality of clusters.

Example 25 may include a method comprising: determining a resource allocation for a signal using a granularity of time units, wherein a single-carrier (SC) symbol includes a plurality of time units; and encoding the signal for transmission based on the resource allocation.

Example 26 may include the method of example 25 or some other example herein, further comprising mapping the time units to respective modulation symbols in the SC symbol.

Example 27 may include the method of example 26 or some other example herein, wherein the mapping includes applying an interleaving operation to the time units.

Example 28 may include the method of example 27 or some other example herein, wherein the interleaving is applied to a group of time units that correspond to multiple consecutive SC symbols.

Example 29 may include the method of example 25-28 or some other example herein, wherein the resource allocation includes a set of SC symbols and a set of time unit indexes corresponding to respective time units within the set of SC symbols.

Example 30 may include the method of example 25-29 or some other example herein, wherein the signal is a PDCCH, and wherein the method further comprises multiplexing a PDSCH with the PDCCH in the SC symbol.

Example 31 may include the method of example 30, wherein the SC symbol is included in a CORESET.

Example 32 may include the method of example 31 or some other example herein, wherein the method further comprises rate matching the PDSCH around a CCE occupied by the PDCCH.

Example 33 may include the method of example 31 or some other example herein, further comprising rate matching the PDSCH around a first CCE occupied by a DL grant and all CCEs with smaller CCE indexes than the first CCE.

Example 34 may include the method of example 31 or some other example herein, further comprising rate matching the PDSCH around a first CCE occupied by a DL grant and all CCEs with smaller CCE indexes than the first CCE in a search space.

Example 35 may include the method of example 31 or some other example herein, further comprising encoding a PTRS for transmission in the CORESET.

Example 36 may include the method of example 35 or some other example herein, wherein the PTRS has a fixed pattern that is independent of PDCCH transmissions in the CORESET.

Example 37 may include the method of example 35 or some other example herein, wherein the PTRS is transmitted in CCEs of the CORESET that are not used for PDSCH transmission.

Example 38 may include the method of example 25-37 or some other example herein, wherein the method is performed by a gNB or a portion thereof.

Example 39 may include an apparatus comprising means to perform one or more elements of a method described in or related to any of examples 1-38, or any other method or process described herein.

Example 40 may include one or more non-transitory computer-readable media comprising instructions to cause an electronic device, upon execution of the instructions by one or more processors of the electronic device, to perform one or more elements of a method described in or related to any of examples 1-38, or any other method or process described herein.

Example 41 may include an apparatus comprising logic, modules, or circuitry to perform one or more elements of a method described in or related to any of examples 1-38, or any other method or process described herein.

Example 42 may include a method, technique, or process as described in or related to any of examples 1-38, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of examples 1-38, or portions thereof.

Example 44 may include a signal as described in or related to any of examples 1-38, or portions or parts thereof.

Example 45 may include a datagram, packet, frame, segment, protocol data unit (PDU), or message as described in or related to any of examples 1-38, or portions or parts thereof, or otherwise described in the present disclosure.

Example 46 may include a signal encoded with data as described in or related to any of examples 1-38, or portions or parts thereof, or otherwise described in the present disclosure.

Example 47 may include a signal encoded with a datagram, packet, frame, segment, protocol data unit (PDU), or message as described in or related to any of examples 1-38, or portions or parts thereof, or otherwise described in the present disclosure.

Example 48 may include an electromagnetic signal carrying computer-readable instructions, wherein execution of the computer-readable instructions by one or more processors is to cause the one or more processors to perform the method, techniques, or process as described in or related to any of examples 1-38, or portions thereof.

Example 49 may include a computer program comprising instructions, wherein execution of the program by a processing element is to cause the processing element to carry out the method, techniques, or process as described in or related to any of examples 1-38, or portions thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions stored thereon that, when executed by one or more processors of a base station, cause the base station to:
    identify a plurality of clusters of a new radio control resource set (CORESET), wherein respective clusters include a physical downlink control channel (PDCCH) portion and a demodulation reference signal (DMRS) portion;
    apply a first discrete fourier transform (DFT) process to a first cluster of the plurality of clusters;
    apply a second DFT process to a second cluster of the plurality of clusters; and
    transmit the first and second clusters.

2. The one or more NTCRM of claim 1, wherein the first DFT process is different from the second DFT process.

3. The one or more NTCRM of claim 1, wherein respective clusters of the plurality of clusters relate to different time/frequency resources than one another.

4. The one or more NTCRM of claim 1, wherein a DFT size of a DMRS portion of a cluster of the plurality of clusters is different from a DFT size of a PDCCH portion of the cluster.

5. The one or more NTCRM of claim 1, wherein the DMRS portion of a cluster of the plurality of clusters is time division multiplexed with the PDCCH portion of the cluster.

6. The one or more NTCRM of claim 1, wherein a PDCCH portion of a cluster of the plurality of clusters is time division multiplexed with a DMRS portion of the cluster.

7. The one or more NTCRM of claim 1, wherein respective DMRS portions of the plurality of clusters are at a beginning of the CORESET.

8. One or more electronic devices comprising:
    one or more processors configured to implement a base station; and
    one or more non-transitory computer-readable media (NTCRM) having instructions stored thereon that, when executed by the one or more processors, cause the base station to:
        identify a plurality of clusters of a new radio control resource set (CORESET), wherein respective clusters include a physical downlink control channel (PDCCH) portion and a demodulation reference signal (DMRS) portion;

apply a first discrete fourier transform (DFT) process to a first cluster of the plurality of clusters;
apply a second DFT process to a second cluster of the plurality of clusters; and
transmit the first and second clusters.

9. The one or more electronic devices of claim 8, wherein the first DFT process is different from the second DFT process.

10. The one or more electronic devices of claim 8, wherein respective clusters of the plurality of clusters relate to different time/frequency resources than one another.

11. The one or more electronic devices of claim 8, wherein a DFT size of a DMRS portion of a cluster of the plurality of clusters is different from a DFT size of a PDCCH portion of the cluster.

12. The one or more electronic devices of claim 8, wherein the DMRS portion of a cluster of the plurality of clusters is time division multiplexed with the PDCCH portion of the cluster.

13. The one or more electronic devices of claim 8, wherein a PDCCH portion of a cluster of the plurality of clusters is time division multiplexed with a DMRS portion of the cluster.

14. The one or more electronic devices of claim 8, wherein respective DMRS portions of the plurality of clusters are at a beginning of the CORESET.

15. A user equipment (UE) comprising:
memory to store a control resource set (CORESET) received from a base station, wherein:
the CORESET includes a plurality of clusters, wherein respective clusters include a physical downlink control channel (PDCCH) portion and a demodulation reference signal (DMRS) portion;
a first discrete fourier transform (DFT) process was applied to a first cluster of the plurality of clusters; and
a second DFT process was applied to a second cluster of the plurality of clusters; and
one or more processors to identify, based on at least one PDCCH portion of a cluster of the plurality of clusters, a PDCCH candidate of a plurality of PDCCH candidates.

16. The UE of claim 15, wherein the first DFT process is different from the second DFT process.

17. The UE of claim 15, wherein respective clusters of the plurality of clusters relate to different time/frequency resources than one another.

18. The UE of claim 15, wherein a DFT size of a DMRS portion of a cluster of the plurality of clusters is different from a DFT size of a PDCCH portion of the cluster.

19. The UE of claim 15, wherein the DMRS portion of a cluster of the plurality of clusters is time division multiplexed with the PDCCH portion of the cluster.

20. The UE of claim 15, wherein a PDCCH portion of a cluster of the plurality of clusters is time division multiplexed with a DMRS portion of the cluster.

* * * * *

UNITED STATES PATENT AND TRADEMARK OFFICE
CERTIFICATE OF CORRECTION

PATENT NO. : 12,238,742 B2
APPLICATION NO. : 18/477380
DATED : February 25, 2025
INVENTOR(S) : Yingyang Li et al.

Page 1 of 1

It is certified that error appears in the above-identified patent and that said Letters Patent is hereby corrected as shown below:

In the Claims

<u>Column 42</u>
Claim 15, Lines 5 and 7, indent the paragraphs

<u>Column 42</u>
Claim 15, Line 9, unindent the paragraph

Signed and Sealed this
Thirteenth Day of May, 2025

Coke Morgan Stewart
*Acting Director of the United States Patent and Trademark Office*